(12) United States Patent
Tabata et al.

(10) Patent No.: US 11,274,742 B2
(45) Date of Patent: Mar. 15, 2022

(54) VEHICLE CONTROL APPARATUS

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Ken Imamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/071,040

(22) Filed: Oct. 15, 2020

(65) Prior Publication Data
US 2021/0148458 A1 May 20, 2021

(30) Foreign Application Priority Data

Nov. 19, 2019 (JP) .............................. JP2019-209193

(51) Int. Cl.
| | |
|---|---|
| *F16H 61/00* | (2006.01) |
| *F16H 61/02* | (2006.01) |
| *F16H 61/14* | (2006.01) |
| *F16H 61/68* | (2006.01) |
| *F16H 59/68* | (2006.01) |

(52) U.S. Cl.
CPC ......... *F16H 61/0213* (2013.01); *F16H 59/68* (2013.01); *F16H 61/14* (2013.01); *F16H 61/68* (2013.01); *F16H 2059/6807* (2013.01); *F16H 2061/0087* (2013.01); *F16H 2061/0223* (2013.01)

(58) Field of Classification Search
CPC ...... F16H 61/0213; F16H 61/14; F16H 61/68; F16H 59/68; F16H 2059/6807; F16H 2061/0087; F16H 2061/0223; F16H 61/061; F16H 2061/064; F16H 2061/062; F16H 2061/0075
See application file for complete search history.

(56) References Cited

U.S. PATENT DOCUMENTS

| | | | |
|---|---|---|---|
| 5,810,694 A * | 9/1998 | Kamada .............. | F16H 61/0206 477/150 |
| 2016/0290250 A1* | 10/2016 | Kurotani ............... | F02D 19/081 |
| 2019/0135284 A1* | 5/2019 | Tokita ................... | B60W 40/09 |

FOREIGN PATENT DOCUMENTS

| | | | | |
|---|---|---|---|---|
| EP | 0635659 A2 * | 1/1995 | ......... | F16H 61/0213 |
| JP | 2017-129039 A | 7/2017 | | |
| JP | 2018091168 A * | 6/2018 | | |

* cited by examiner

*Primary Examiner* — Justin Holmes
(74) *Attorney, Agent, or Firm* — Oliff PLC

(57) ABSTRACT

A vehicle control apparatus for controlling a control-subject component provided in a vehicle, by using a learning value of a control parameter which is obtained by a learning operation. The control apparatus includes an obtaining portion for obtaining information related to converged values of learning values of control parameters in a plurality of vehicles provided with respective control-subject components which are the same in type as the control-subject component provided in the vehicle, and a variation determination portion for determining whether a degree of variation among the converged values in the respective vehicles is smaller than a threshold value. The vehicle control apparatus causes the learning value to be converged by a smaller number of times of execution of the learning operation when the degree of the variation is smaller than the threshold value, than when the degree of the variation is not smaller than the threshold value.

11 Claims, 16 Drawing Sheets

FIG.4

|  |  | HYDRAULICALLY-OPERATED FRICTIONAL ENGAGEMENT DEVICES | | | | | SOLENOID VALVES | | | | | |
|---|---|---|---|---|---|---|---|---|---|---|---|---|
|  |  | C1 | C2 | B1 | B2 | F1 | SL1 | SL2 | SL3 | SL4 | SC1 | SC2 |
| P |  | O |  |  | O |  | O |  |  | O | O | O |
| Rev |  | O |  |  | O |  | O |  |  | O | O | O |
| N |  | O |  |  | O |  | O |  |  | O | O |  |
| D | 1st | O |  |  | O | O | O |  |  | O | O |  |
|  | 2nd | O |  | O |  |  | O |  | O |  | O |  |
|  | 3rd | O | O |  |  |  | O | O |  |  | O |  |
|  | 4th |  | O | O |  |  |  | O | O |  | O |  |

FIG.10

| THROTTLE OPENING DEGREE θ th [%] | CORRECTION VALUE CMP [A] LEARNED BY IN-FIELD LEARNING OPERATION |
|---|---|
| 0-25 | $\Delta Pc2-1$ |
| 25-50 | $\Delta Pc2-2$ |
| 50-75 | $\Delta Pc2-3$ |
| 75-100 | $\Delta Pc2-4$ |

VEHICLE CONTROL APPARATUS

This application claims priority from Japanese Patent Application No. 2019-209193 filed on Nov. 19, 2019, the disclosure of which is herein incorporated by reference in its entirety.

FIELD OF THE INVENTION

The present invention relates to a vehicle control apparatus for controlling a control-subject component that is provided in a vehicle, by using a learning value of a control parameter which is obtained by a learning operation.

BACKGROUND OF THE INVENTION

There is widely known a vehicle control apparatus in which, when a learning value of a control parameter used for controlling a control-subject component provided in a vehicle is reset to an initial value, the initial value is set to a value based on learning values in a plurality of other vehicles provided with respective control-subject component each of which is the same in type as the control-subject component provided in the vehicle. JP-2017-129039A discloses an example of such a vehicle control apparatus.

SUMMARY OF THE INVENTION

However, in the vehicle control apparatus in which the initial value is set to the value based on the learning values in the respective other vehicles, when there is a large variation among the learning values, there is a risk that a controllability of the vehicle could be reduced by controlling the control-subject component with use of the learning value that has been reset to the initial value based on the learning values in the plurality of other vehicles.

The present invention was made in view of the background art described above. It is therefore an object of the present invention to a vehicle control apparatus in which, when a learning value of a control parameter used for controlling a control-subject component provided in a vehicle is reset to an initial value, the initial value is set to a value based on learning values in a plurality of other vehicles provided with respective control-subject component each of which is the same in type as the control-subject component provided in the vehicle, wherein the vehicle control apparatus is capable of early improving a controllability of the vehicle after the learning value has been reset to the initial value.

The object indicated above is achieved according to the following aspects of the present invention.

According to a first aspect of the invention, there is provided a vehicle control apparatus for controlling a control-subject component provided in a vehicle, by using a learning value of a control parameter which is obtained by a learning operation, the vehicle control apparatus comprising: (a) a reset determination portion configured to determine whether the learning value of the control parameter is to be reset to an initial value or not; (b) an obtaining portion configured to obtain information related to converged values of learning values of control parameters in a plurality of vehicles provided with respective control-subject components each of which is the same in type as the control-subject component provided in the vehicle, the control-subject components being controlled by using the respective learning values in the respective vehicles; and (c) a variation determination portion configured to determine whether a degree of variation among the converged values in the respective vehicles is smaller than a threshold value or not; wherein the vehicle control apparatus is configured, when it is determined by the reset determination portion that the learning value is to be reset to the initial value, to cause the learning value to be converged by a smaller number of times of execution of the learning operation in a case in which it is determined by the variation determination portion that the degree of the variation among the converged values in the respective vehicles is smaller than the threshold value, than in a case in which it is determined by the variation determination portion that the degree of the variation is not smaller than the threshold value. It can be considered that the vehicle control apparatus cooperates with control apparatuses (each of which functionally corresponds to the vehicle control apparatus) of the respective other vehicles to constitute a vehicle control system that shares, between the control apparatuses, the information related to the converged values of the learning values of the control parameters.

According to a second aspect of the invention, in the vehicle control apparatus according to the first aspect of the invention, there is further provided (d) an initial-value setting portion, wherein the initial-value setting portion is configured to set the initial value to a first learning value that is dependent on an average of the converged values in the respective vehicles, when it is determined by the variation determination portion that the degree of the variation is smaller than the threshold value and it is determined by the reset determination portion that the learning value is to be reset to the initial value, and wherein the initial-value setting portion is configured to set the initial value to a second learning value that is dependent on an average of pre-learning values of the control parameters in the plurality of vehicles, when it is determined by the variation determination portion that the degree of the variation is not smaller than the threshold value and it is determined by the reset determination portion that the learning value is to be reset to the initial value.

According to a third aspect of the invention, in the vehicle control apparatus according to the first aspect of the invention, there is further provided (e) a learning portion configured, when it is determined by the variation determination portion that the degree of the variation is smaller than the threshold value and when the learning value has been reset to the initial value, to increase or reduce the learning value by a correction amount in each one execution of the learning operation, such that the correction amount is larger in a case in which the learning value is increased or reduced to be changed in a direction away from the initial value toward an average of the converged values, than in a case in which the learning value is increased or reduced to be changed in an opposite direction opposite to the direction away from the initial value toward the average of the converged values.

According to a fourth aspect of the invention, in the vehicle control apparatus according to the second aspect of the invention, the control-subject components is a transmission, wherein the control parameter is a hydraulic command value of the transmission.

According to a fifth aspect of the invention, in the vehicle control apparatus according to the fourth aspect of the invention, the transmission includes a step-variable transmission configured to establish a selected one of a plurality of gear positions, wherein the hydraulic command value is a command value in a shift control operation for shifting the step-variable transmission from one of the gear positions to another one of the gear positions.

According to a sixth aspect of the invention, in the vehicle control apparatus according to the fifth aspect of the invention, the step-variable transmission is establish the another one of the gear positions with a hydraulic engagement device being placed in one of an engaged state and a released state, wherein the first learning value, to which the initial value is set by the initial-value setting portion, is different from the average of the converged values by a certain offset value, and is offset from the average toward a value that maximizes a speed at which the hydraulic engagement device is to be placed in the one of the engaged state and the released state.

According to a seventh aspect of the invention, in the vehicle control apparatus according to the third aspect of the invention, the control-subject components is a transmission, wherein the control parameter is a hydraulic command value of the transmission, wherein the transmission includes a step-variable transmission configured to establish a selected one a plurality of gear positions, wherein the hydraulic command value is a command value in a shift control operation for shifting the step-variable transmission from one of the gear positions to another one of the gear positions, and wherein the learning portion is configured to execute the learning operation, based on a degree of racing of a drive force source of the vehicle in execution of the shift control operation for shifting the step-variable transmission from the one of the gear positions to the another one of the gear positions.

According to an eighth aspect of the invention, in the vehicle control apparatus according to the seventh aspect of the invention, the learning portion is configured, when a difference between a target value and an actual value of the degree of the racing is larger than a threshold difference value, to increase or reduce the learning value by a correction amount in each one execution of the learning operation, such that the correction amount is larger in a case in which the learning value is increased or reduced to be changed in a direction away from the initial value toward an average of the converged values, than in a case in which the learning value is increased or reduced to be changed in an opposite direction opposite to the direction away from the initial value toward the average of the converged values.

According to a ninth aspect of the invention, in the vehicle control apparatus according to the fifth or sixth aspect of the invention, the obtaining portion is configured to obtain the information related to the converged values of the learning values of the control parameters in at least one of the plurality of vehicles, each of the at least one of the plurality of vehicles being different from the vehicle by a predetermined value or less in at least one of (i) a number of times at which the shift control operation has been executed in the step-variable transmission, (ii) a period of time for which the step-variable transmission has been used and (iii) a running distance for which each of the plurality of vehicles has run with use of the step-variable transmission.

According to a tenth aspect of the invention, in the vehicle control apparatus according to the fourth aspect of the invention, the transmission includes a torque convertor, wherein the hydraulic command value is a command value in an engagement control operation for controlling an engaging action of a lockup clutch of the torque convertor.

According to an eleventh aspect of the invention, in the vehicle control apparatus according to the tenth aspect of the invention, the obtaining portion is configured to obtain the information related to the converged values of the learning values of the control parameters in at least one of the plurality of vehicles, each of the at least one of the plurality of vehicles is different from the vehicle by a predetermined value or less in at least one of (i) a number of times at which the engaging action has been executed in the lockup clutch, (ii) a period of time for which the lockup clutch has been used and (iii) a running distance for which each of the plurality of vehicles has run with use of the lockup clutch.

According to a twelfth aspect of the invention, in the vehicle control apparatus according to any one of the first through eleventh aspects of the invention, the variation determination portion is configured to determine whether the degree of variation among the converged values in the respective vehicles is smaller than the threshold value or not, by determining whether a variance among the converged values in the respective vehicles is smaller than the threshold value or not.

The vehicle control apparatus according to the first aspect of the invention includes: (a) a reset determination portion configured to determine whether the learning value of the control parameter is to be reset to an initial value or not; (b) an obtaining portion configured to obtain information related to converged values of learning values of control parameters in a plurality of vehicles provided with respective control-subject components each of which is the same in type as the control-subject component provided in the vehicle, the control-subject components being controlled by using the respective learning values in the respective vehicles; and (c) a variation determination portion configured to determine whether a degree of variation among the converged values in the respective vehicles is smaller than a threshold value or not; wherein the vehicle control apparatus is configured, when it is determined by the reset determination portion that the learning value is to be reset to the initial value, to cause the learning value to be converged by a smaller number of times of execution of the learning operation in a case in which it is determined by the variation determination portion that the degree of the variation among the converged values in the respective vehicles is smaller than the threshold value, than in a case in which it is determined by the variation determination portion that the degree of the variation is not smaller than the threshold value. Therefore, the vehicle control apparatus is capable of early improving a controllability of the vehicle after the learning value has been reset to the initial value, especially, in the case in which the degree of the variation among the converged values in the respective vehicles is small. The vehicle control apparatus according to the second aspect of the invention further includes the initial-value setting portion, wherein the initial-value setting portion is configured to set the initial value to a first learning value that is dependent on an average of the converged values in the respective vehicles, when it is determined by the variation determination portion that the degree of the variation is smaller than the threshold value and it is determined by the reset determination portion that the learning value is to be reset to the initial value, and wherein the initial-value setting portion is configured to set the initial value to a second learning value that is dependent on an average of pre-learning values of the control parameters in the plurality of vehicles, when it is determined by the variation determination portion that the degree of the variation is not smaller than the threshold value and it is determined by the reset determination portion that the learning value is to be reset to the initial value. In the case in which the degree of the variation among the converged values in the respective vehicles (provided with respective control-subject components each of which is the same in type as the control-subject component provided in the vehicle) is small, there is a high probability that the learning value in the vehicle is converged to a value close to the average of the converged values in the respective vehicles by the learning operation executed after the learning value has been reset to the initial value. Therefore, in the case in which the degree of the variation among the converged values in the respective vehicles is small, the initial-value setting portion sets the initial value to the first learning value that is likely to be a value close to a converged value of the learning value in the vehicle. On the other hand, in the case in which the degree of the variation among the converged values in the respective vehicles is large, it is doubtful that there is the high probability that the learning value in the vehicle is converged to the value close to the average of the converged values in the respective vehicles when the learning value has been reset to the initial value. Therefore, in the case in which the degree of the variation among the converged values in the respective vehicles is large, the initial-value setting portion sets the initial value to the second learning value, rather than to the first learning value that is doubtful to be a value close to the converged value of the learning value in the vehicle. Thus, the vehicle control apparatus according to the second aspect is capable of early improving the controllability of the vehicle after the learning value has been reset to the initial value.

The vehicle control apparatus according to the third aspect of the invention further includes the learning portion configured, when it is determined by the variation determination portion that the degree of the variation is smaller than the threshold value and when the learning value has been reset to the initial value, to increase or reduce the learning value by a correction amount in each one execution of the learning operation, such that the correction amount is larger in a case in which the learning value is increased or reduced to be changed in a direction away from the initial value toward an average of the converged values that is likely to be a value close to the converged value of the learning value in the vehicle, than in a case in which the learning value is increased or reduced to be changed in an opposite direction opposite to the direction away from the initial value toward the average of the converged values. It is therefore possible to early improve the controllability of the vehicle after the learning value has been reset to the initial value.

In the vehicle control apparatus according to the fourth aspect of the invention, the control-subject components is the transmission, wherein the control parameter is a hydraulic command value of the transmission. Owing to this arrangement, it is possible to early resolve issues such as a shifting shock and an engagement shock that could be caused in a shifting action in the transmission after the learning value has been reset to the initial value.

In the vehicle control apparatus according to the fifth aspect of the invention, the transmission includes the step-variable transmission, wherein the hydraulic command value is the command value in the shift control operation for shifting the step-variable transmission from one of the gear positions to another one of the gear positions. Owing to this arrangement, it is possible to early improve issues such as the shifting shock that could be caused in a shifting action in the step-variable transmission after the learning value has been reset to the initial value.

In the vehicle control apparatus according to the sixth aspect of the invention, the first learning value, to which the initial value is set by the initial-value setting portion, is different from the average of the converged values by the certain offset value, and is offset from the average toward a tie-up side, namely, the value that maximizes the speed at which the hydraulic engagement device is to be placed in the one of the engaged state and the released state. Owing to this arrangement in which the first learning value is offset from the average toward the tie-up side, it is possible to suppress seizing of frictional engagement device, bearing and other components provided in a drive-force transmitting path, which could be caused in the event of an excessive racing of an engine shortly after the learning value has been reset to the initial value.

In the vehicle control apparatus according to the seventh aspect of the invention, the learning portion executes the learning operation, based on the degree of racing of the drive force source of the vehicle in execution of the shift control operation for shifting the step-variable transmission from the one of the gear positions to the another one of the gear positions. Owing to this arrangement in which the learning operation is executed based on the degree of racing, it is possible to set the hydraulic command value as the control parameter, to a value by which the shifting shock and a length of time required to complete the shifting action can be in respective permissible ranges.

In the vehicle control apparatus according to the eighth aspect of the invention, the learning portion is configured, when a difference between a target value and an actual value of the degree of the racing is larger than a threshold difference value, to increase or reduce the learning value by the correction amount in each one execution of the learning operation, such that the correction amount is larger in the case in which the learning value is increased or reduced to be changed in the direction away from the initial value toward an average of the converged values, than in the case in which the learning value is increased or reduced to be changed in the opposite direction opposite to the direction away from the initial value toward the average of the converged values. Owing to this arrangement, it is possible to avoid an erroneous learning in the learning operation after the reset of the learning value, and also to cause the learning value to be quickly converged, whereby the controllability of the vehicle can be quickly improved after the reset of the learning value.

In the vehicle control apparatus according to the ninth aspect of the invention, the obtaining portion is configured to obtain the information related to the converged values of the learning values of the control parameters in at least one of the plurality of vehicles, each of the at least one of the plurality of vehicles being different from the vehicle by a predetermined value or less in at least one of (i) a number of times at which the shift control operation has been executed in the step-variable transmission, (ii) a period of time for which the step-variable transmission has been used and (iii) a running distance for which each of the plurality of vehicles has run with use of the step-variable transmission. The average of the converged values in the above-described at least one of the plurality of vehicles that is similar to the vehicle in terms of at least one of the above-described number of times, period of time and running distance, is more likely to be a value close to the converged value of the learning value in the vehicle, as compared with an average of the converged values of the other vehicles that are not similar to the vehicle in terms of any one of the above-described number of times, period of time and running distance. Therefore, it is possible to more reliably cause the learning value to be quickly converged by a smaller number of times of execution of the learning operation, whereby the controllability of the vehicle can be further quickly improved after the reset of the learning value.

In the vehicle control apparatus according to the tenth aspect of the invention, the transmission includes a torque convertor, wherein the hydraulic command value is a command value in an engagement control operation for controlling an engaging action of a lockup clutch of the torque convertor. Owing to this arrangement, it is possible to early resolve issues such as an engagement shock that could be caused in an engagement action in the lockup clutch of the torque convertor after the learning value has been reset to the initial value.

In the vehicle control apparatus according to the eleventh aspect of the invention, the obtaining portion is configured to obtain the information related to the converged values of the learning values of the control parameters in at least one of the plurality of vehicles, each of the at least one of the plurality of vehicles is different from the vehicle by a predetermined value or less in at least one of (i) a number of times at which the engaging action has been executed in the lockup clutch, (ii) a period of time for which the lockup clutch has been used and (iii) a running distance for which each of the plurality of vehicles has run with use of the lockup clutch. The average of the converged values in the above-described at least one of the plurality of vehicles that is similar to the vehicle in terms of at least one of the above-described number of times, period of time and running distance, is more likely to be a value close to the converged value of the learning value in the vehicle, as compared with an average of the converged values of the other vehicles that are not similar to the vehicle in terms of any one of the above-described number of times, period of time and running distance. Therefore, it is possible to more reliably cause the learning value to be quickly converged by a smaller number of times of execution of the learning operation, whereby the controllability of the vehicle can be further quickly improved after the reset of the learning value.

In the vehicle control apparatus according to the twelfth aspect of the invention, the variation determination portion is configured to determine whether the degree of variation among the converged values in the respective vehicles is smaller than the threshold value or not, by determining whether a variance among the converged values in the respective vehicles is smaller than the threshold value or not. By using the variance as an index representing the degree of variation, the degree of variation among the converged values can be accurately determined, even if peculiar data are included in a distribution of the converged values of the learning values in the respective vehicles.

BRIEF DESCRIPTION OF THE DRAWINGS

FIG. 4 is a table for explaining a relationship between each gear position of the step-variable transmission portion and a combination of hydraulically-operated frictional engagement devices of the step-variable transmission portion (which are placed in engaged states to establish the gear position), together with an operation state of each solenoid;

FIG. 10 is a view showing, by way of examples, a correction value of the drive current that has been learned in executions of the shift-up action from the second speed gear position to the third speed gear position in the step-variable transmission portion, wherein the correction value is stored for each range of a throttle valve opening degree;

DETAILED DESCRIPTION OF PREFERRED EMBODIMENT

Hereinafter, preferred embodiments of the invention will be described in detail with reference to the accompanying drawings. The figures of the drawings are simplified or deformed as needed, and each portion is not necessarily precisely depicted in terms of dimension ratio, shape, etc.

First Embodiment

Figure 1:
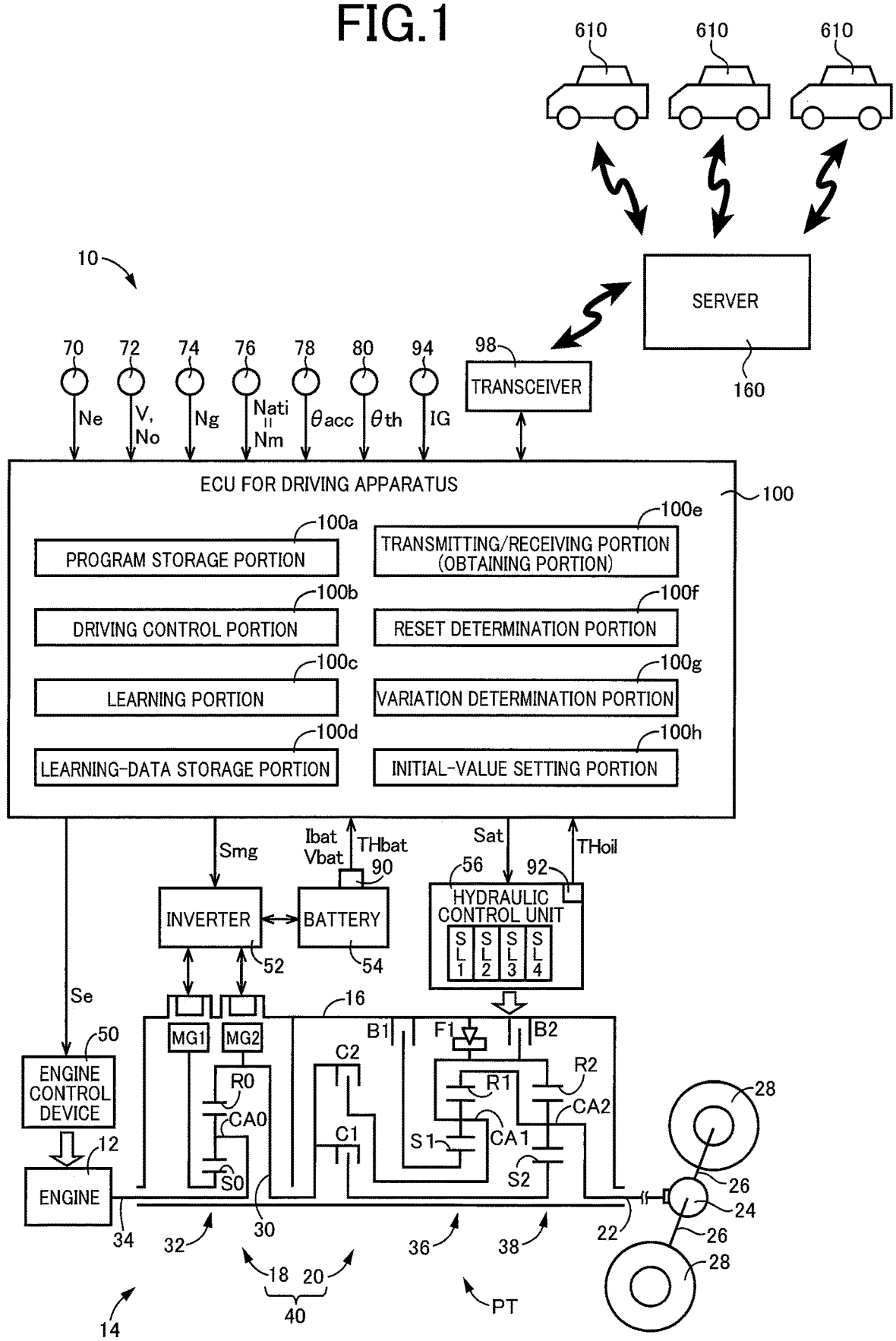
FIG. 1 is a view schematically showing a construction of a vehicle provided with an ECU for a driving apparatus, which is constructed according to a first embodiment of the present invention, and is a functional block diagram showing major portions of control functions for various control operations executed in the vehicle.

FIG. 1 is a view schematically showing a construction of a vehicle 10 provided with an ECU 100 for a driving apparatus, which is constructed according to a first embodiment of the present invention, and is a functional block diagram showing major portions of control functions for various control operations executed in the vehicle 10. FIG. 1 shows also other vehicles 610 that are other than the vehicle 10 (that will be referred to as "own vehicle 10" where the vehicle 10 is to be particularly distinguished from the other vehicles 610). Since each of the other vehicles 610 has substantially the same construction as the vehicle 10, its description will not be provided. It is noted that the own vehicle 10 and the other vehicles 610 cooperate to constitute "a plurality of vehicles" recited in the appended claims.

The vehicle 10 is a hybrid vehicle, and includes an engine 12, a first rotating machine MG1, a second rotating machine MG2, a drive-force transmitting device 14, drive wheels 28, the above-described ECU 100 and a transceiver 98.

The engine 12 is constituted by an internal combustion engine such as gasoline engine and diesel engine, which serves as a drive force source for driving the vehicle 10. The vehicle 10 is provided with an engine control device 50 that includes an electronic throttle valve, a fuel injection device and an ignition device. With the engine control device 50 being controlled by the ECU 100, an engine torque Te [Nm], which is an output torque of the engine 12, is controlled.

Each of the first and second rotating machines MG1, MG2 is a rotating electric machine having a function serving as an electric motor and a function serving as a generator. That is, each of the first and second rotating machines MG1, MG2 is a so-called "motor generator", and can be a drive force source for driving the vehicle 10. The first and second rotating machines MG1, MG2 are connected to a battery 54 provided in the vehicle 10, through an inverter 52 provided in the vehicle 10. The inverter 52 is controlled by the ECU 100 whereby an MG1 torque Tg [Nm] and an MG2 torque Tm [Ng] as output torques of the respective first and second rotating machines MG1, MG2 are controlled. The output torque of each of the first and second rotating machines MG1, MG2 serves as a power running torque when acting as a positive torque for acceleration, with the each of the first and second rotating machines MG1, MG2 being rotated in a forward direction. The output torque of each of the first and second rotating machines MG1, MG2 serves as a regenerative torque when acting as a negative torque for deceleration, with the each of the first and second rotating machines MG1, MG2 being rotated in the forward direction. When each of the MG1 torque Tg and the MG2 torque Tm as the output torque of a corresponding one of the first and second rotating machines MG1, MG2 serves as the power running torque, a drive force outputted from the corresponding one of the first and second rotating machines MG1, MG2 is a drive force for driving the vehicle 10. The term "drive force" is synonymous with a drive torque or a drive power unless otherwise distinguished from them. The battery 54 is an electric storage device to and from which an electric power is supplied from and to the first rotating machine MG1 and the second rotating machine MG2. The battery 54 is a chargeable/dischargeable secondary battery such as a lithium-ion battery pack and a nickel-metal hydride battery pack. The first and second rotating machines MG1, MG2 are disposed inside a transaxle case 16 as a non-rotary member attached to a body of the vehicle 10.

The drive-force transmitting device 14 includes the above-described transaxle case 16, an electrically-operated continuously-variable transmission portion 18 and a mechanically-operated step-variable transmission portion 20. The continuously-variable transmission portion 18 and the step-variable transmission portion 20 are provided within the casing 16, and are arranged in a series on a common axis. The continuously-variable transmission portion 18 is connected to the engine 12 directly or indirectly through, for example, a damper (not shown). The step-variable transmission portion 20 is connected to an output rotary member of the continuously-variable transmission portion 18. The drive-force transmitting device 14 further includes a differential gear device 24 connected to an output shaft 22 that is an output rotary member of the step-variable transmission portion 20, and a pair of axles 26 connected to the differential gear device 24. In the drive-force transmitting device 14, the drive force outputted from the engine 12 or the second rotating machine MG2 is transmitted to the step-variable transmission portion 20, and is then transmitted from the step-variable transmission portion 20 through the differential gear device 24, for example, to drive wheels 28 of the vehicle 10. The drive-force transmitting device 14 constructed as described above is used advantageously for a vehicle of FR (front engine and rear drive) system. It is noted that the drive-force transmitting device 14 including the continuously-variable transmission portion 18 and the step-variable transmission portion 20 is constructed substantially symmetrically about its axis corresponding to the above-described common axis, so that a lower half of the drive-force transmitting device 14 is not shown in FIG. 1. The above-described common axis corresponds to axes of a crank shaft of the engine 12 and a connecting shaft 34 connected to the crank shaft. The continuously-variable transmission portion 18, step-variable transmission portion 20, differential gear device 24 and axles 26 of the drive-force transmitting device 14 cooperate to constitute a drive-force transmitting path PT provided between the engine 12 and the drive wheels 28.

The continuously-variable transmission portion 18 is provided with a differential mechanism 32 serving as a drive-force distributing device to mechanically distribute the drive force of the engine 12 to the first rotating machine MG1 and to an intermediate transmitting member 30 that is an output rotary member of the continuously-variable transmission portion 18. The first rotating machine MG1 is a rotating machine to which the drive force of the engine 12 is to be transmitted. The second rotating machine MG2 is connected to the intermediate transmitting member 30 in a drive-force transmittable manner. The intermediate transmitting member 30 is connected to the drive wheels 28 through the step-variable transmission portion 20, so that the second rotating machine MG2 is connected to the drive-force transmitting path PT in a drive-force transmittable manner. Thus, the second rotating machine MG2 is a rotating machine connected to the drive wheels 28 in a drive-force transmittable manner.

The differential mechanism 32 is a known planetary gear device of a single-pinion type having a sun gear S0, a carrier CA0 and a ring gear R0.

The step-variable transmission portion 20 is a mechanically-operated transmission mechanism that constitutes a part of the drive-force transmitting path PT between the intermediate transmitting member 30 and the drive wheels 28, namely, is an automatic transmission that constitutes a part of the drive-force transmitting path PT between the differential mechanism 32 and the drive wheels 28. The intermediate transmitting member 30 also serves as an input rotary member of the step-variable transmission portion 20. The step-variable transmission portion 20 is a known automatic transmission of a planetary gear type that is provided with a plurality of planetary gear devices in the form of a first planetary gear device 36 and a second planetary gear device 38, and a plurality of engagement devices including a clutch C1, a clutch C2, a brake B1, a brake B2 and a one-way clutch F1. Hereinafter, the clutch C1, clutch C2, brake B1 and brake B2 will be referred to as hydraulically-operated frictional engagement devices CB unless otherwise specified. It is noted that the step-variable transmission portion 20 corresponds to "step-variable transmission" recited in the appended claims.

Each of the hydraulically-operated frictional engagement devices CB is a hydraulically-operated frictional engagement device in the form of a multiple-disc type or a single-disc type clutch or brake that is to be pressed by a hydraulic actuator, or a band brake that is to be tightened by a hydraulic actuator. The hydraulically-operated frictional engagement devices CB are selectively placed in engaged, slipped or released states as the operation states, depending on respective regulated hydraulic pressures outputted from a hydraulic control unit (hydraulic control circuit) 56 which is provided in the vehicle 10 and which is controlled by the ECU 100.

The first planetary gear device 36 is a known planetary gear device of a single-pinion type having a sun gear S1, a carrier CA1 and a ring gear R1. The second planetary gear device 38 is a known planetary gear device of a single-pinion type having a sun gear S2, a carrier CA2 and a ring gear R2.

The differential mechanism 32, first planetary gear device 36, second planetary gear device 38, hydraulically-operated frictional engagement devices CB, one-way clutch F1, first rotating machine MG1 and second rotating machine MG2 are connected to one another, as shown in FIG. 1.

The hydraulically-operated frictional engagement devices CB are controlled by the hydraulic control unit 56 that is provided in the vehicle 10. Specifically, an engaging torque, i.e., a torque capacity of each of the hydraulically-operated frictional engagement devices CB is changed by respective regulated engaging hydraulic pressures outputted from respective linear solenoid valves SL1-SL4 provided in the hydraulic control unit 56.

With a combination of the operation states of the respective hydraulically-operated frictional engagement devices CB being switched to another combination, the step-variable transmission portion 20 is shifted to a selected one of a plurality of AT gear positions (speed positions) having respective different gear ratios (speed ratios) γat (=AT input rotational speed Naiti [rpm]/AT output rotational speed Nato [rpm]). Namely, the step-variable transmission portion 20 is shifted up or down from one gear position to another by placing selected ones of the hydraulically-operated frictional engagement devices CB in the engaged states. The AT input rotational speed Nati is an input rotational speed of the step-variable transmission portion 20 that is a rotational speed of the input rotary member of the step-variable transmission portion 20, which is equal to a rotational speed of the intermediate transmitting member 30, and which is equal to an MG2 rotational speed Nm [rpm] that is an rotational speed of the second rotating machine MG2. The AT output rotational speed Nato is a rotational speed of the output shaft 22 that is an output rotary member of the step-variable transmission portion 20, which is considered to be an output rotational speed No [rpm] of a transmission device (composite transmission) 40 which essentially consists of the continuously-variable transmission portion 18 and the step-variable transmission portion 20. It is noted that the transmission device 40 including the step-variable transmission portion 20 corresponds to "transmission" and "control-subject component" that are recited in the appended claims.

Figure 2:
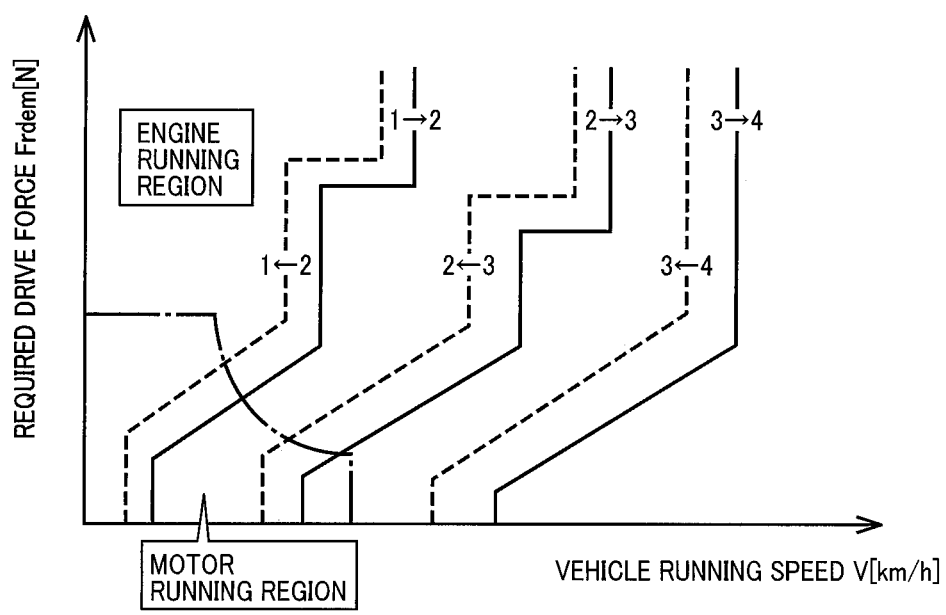
FIG. 2 is a view showing, by way of examples, a shifting map used for executing a shift control operation in a step-variable transmission portion, and a drive-force-source switching map used for executing a switch control operation for switching between an engine running and a motor running, wherein a relationship between the shifting map and the drive-force-source switching map is also shown in the view.

FIG. 2 is a view showing, by way of examples, a shifting map used for executing a shift control operation in the step-variable transmission portion 20, and a drive-force-source switching map used for executing a switch control operation for switching between an engine running and a motor running, wherein a relationship between the shifting map and the drive-force-source switching map is also shown in the view. The engine running is a running mode in which the vehicle 10 is driven to run by the engine 12 serving as the drive force source. The motor running is another running mode in which the vehicle 10 is driven to run by the first rotating machine MG1 or the second rotating machine MG2 serving as the drive force source without the engine 12 serving as the drive force source. The shift map and the drive-force-source switching map having two variables in the form of a vehicle running speed V [km/h] and a required drive force Frdem [N], which are shown in FIG. 2, are predetermined and stored in, for example, the EUC 100. When a point defined by a combination of actual values of the two variables, i.e., the running speed V and the required drive force Frdem is moved across one of shift-up lines (indicated by solid lines in FIG. 2) and shift-down lines (indicated by broken lines in FIG. 2) of the shift map, it is determined that the shift control operation is to be started. The motor running is executed in a low running speed range or a low load range that are defined by one-dot chain line in FIG. 2, wherein the low running speed range is a range in which the running speed V is relatively low and, in general, an engine efficiency is low, and the low load range is a range in which the required drive force Frdem is relative small. The motor running is established when a charged state value (charged capacity) SOC [%] of the battery 54 that is connected to the second rotating machine MG2 through the inverter 52 is not lower than a predetermined value. The step-variable transmission portion 20 establishes a selected one of the gear positons which is selected in accordance with the shifting map, whereby the vehicle 10 has a satisfactory fuel efficiency.

Figure 3:
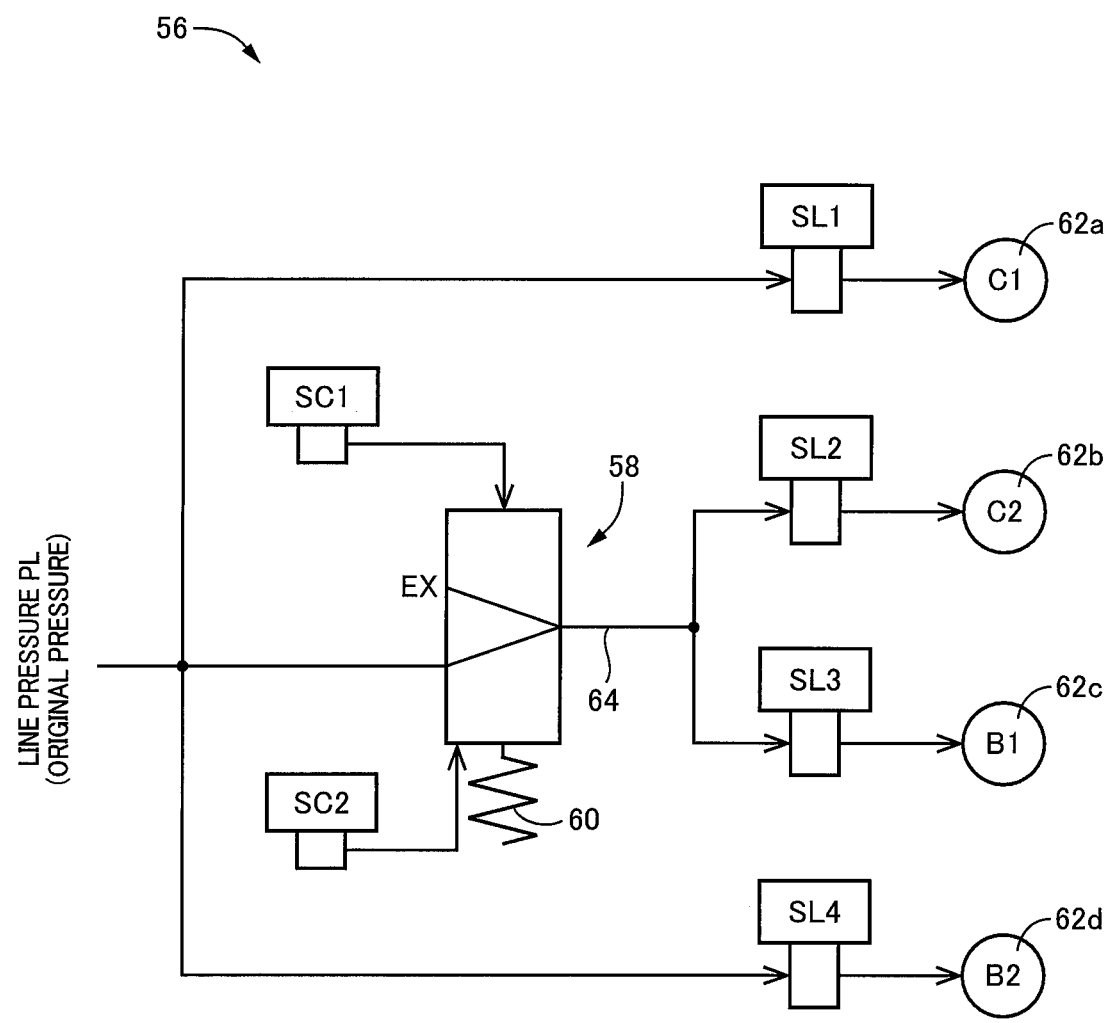
FIG. 3 is a hydraulic circuit diagram showing, by way of example, a part of a hydraulic control unit for executing a shift control operation in the step-variable transmission portion.

FIG. 3 is a hydraulic circuit diagram showing, by way of example, a part of the hydraulic control unit 56 for executing the shift control operation in the step-variable transmission portion 20.

The hydraulic control unit 56 includes the above-described linear solenoid valves SL1-SL4 (hereinafter referred simply to as "linear solenoid valves SL" unless there are to be distinguished from one another), solenoid valves SC1, SC2 (hereinafter referred simply to as "solenoid valves SC"

unless there are to be distinguished from each other, and a switch valve 58, for controlling the engaging torques of the respective hydraulically-operated frictional engagement device CB as engaging elements provided in the step-variable transmission portion 20.

Each of the linear solenoid valves SL is an electromagnetic valve which is configured to receive, as an original pressure, a line pressure PL [Pa] regulated by a regulator valve (not shown) and to output a hydraulic pressure that is dependent on a hydraulic control command signal Sat supplied from the ECU 100 (see FIG. 1). That is, in the linear solenoid valve SL, the line pressure PL is controlled to the hydraulic pressure that is to be outputted from the linear solenoid valve SL, in accordance with an electromagnetic force of a solenoid of the linear solenoid valve SL that is controlled based on the hydraulic control command signal Sat.

The hydraulic pressure outputted from the linear solenoid valve SL1 is supplied to a hydraulic actuator 62a for controlling the operation state of the clutch C1. The hydraulic pressure outputted from the linear solenoid valve SL2 is supplied to a hydraulic actuator 62b for controlling the operation state of the clutch C2. The hydraulic pressure outputted from the linear solenoid valve SL3 is supplied to a hydraulic actuator 62c for controlling the operation state of the brake B1. The hydraulic pressure outputted from the linear solenoid valve SL4 is supplied to a hydraulic actuator 62d for controlling the operation state of the brake B2.

Each of the solenoid valves SC1, SC2 is to be operated based on based on the hydraulic control command signal Sat supplied from the ECU 100, so as to switch the switch valve 58 between its ON state and OFF state. When being placed in the ON state, the switch valve 58 is allowed to output the hydraulic pressure. When being placed in the OFF state, the switch valve 58 is inhibited from outputting the hydraulic pressure. Each of the solenoid valves SC1, SC2 is preferably a normally-closed ON-OFF valve.

When each of the solenoid valves SC1, SC2 is placed in its ON state, the hydraulic pressure is supplied from each of the solenoid valves SC1, SC2. When each of the solenoid valves SC1, SC2 is placed in its OFF state, the hydraulic pressure is not supplied from each of the solenoid valves SC1, SC2. The switch valve 58 is provided with a spring 60 that constantly forces or bias a spool valve element provided in the switch valve 58. When the solenoid valves SC1, SC2 are both placed in the respective OFF states, the switch valve 58 placed in the OFF state with the spool valve element being forced by a biasing force of the spring 60. When the solenoid valve SC1 is placed in the ON state and the solenoid valve SC2 is placed in the OFF state, the switch valve 58 placed in the ON state with the spool valve element being moved against the biasing force of the spring 60. When the solenoid valves SC1, SC2 are both placed in the respective ON states, the switch valve 58 placed in the OFF state with the spool valve element being forced by the biasing force of the spring 60.

That is, as shown in FIG. 3, when the solenoid valves SC1, SC2 are placed in the ON state and OFF state, respectively, in the hydraulic control unit 56, a supply source of the line pressure PL is brought into communication with a fluid passage 64 that is connected to the linear solenoid valves SL2, SL3. When both of the solenoid valves SC1, SC2 are placed in the ON states or OFF states, the fluid communication between the supply source of the line pressure PL (original pressure) and the fluid passage 64 is blocked while a drain port EX and the fluid passage 64 are brought into communication with each other.

FIG. 4 is a table for explaining a relationship between each gear position of the step-variable transmission portion 20 and a combination of the hydraulically-operated frictional engagement devices CB (that are to be placed in engaged states to establish the gear position), together with the operation state of each of the solenoids. In columns of "ENGAGEMENT DEVICE" of the table of FIG. 4, "O" indicates the engaged state of the corresponding engagement device CB, and blank indicates the released state of the corresponding engagement device CB. In columns of "SOLENOID VALVES" in the table of FIG. 4, "O" indicates that the hydraulic pressure is outputted from the corresponding solenoid valve, and blank indicates that the hydraulic pressure is not outputted from the corresponding solenoid valve.

Further, in FIG. 4, "P", "Rev", "N", "D" represent a parking range, a reverse range, a neutral range and a drive range, respectively, which are selectively selected by a manual operation of a shift lever. Each of the parking range and the neutral range is a non-driving range that is to be selected when the vehicle 10 is not driven to run. The reverse range is a driving range that is to be selected when the vehicle 10 is driven to run in reverse direction. The drive range is a driving range that is to be selected when the vehicle 10 is driven to run in forward direction. The linear solenoid valves SL and the solenoid valves SC are controlled so as to place each of the hydraulically-operated frictional engagement devices CB into the engaged or released state, as shown in FIG. 4. Depending on the combination of those of the hydraulically-operated frictional engagement devices CB, which are placed in the engaged states, one of the above-described parking range, reverse range, neutral range and drive range is established in the drive-force transmitting device 14 and one of the gear positions is established in the step-variable transmission portion 20.

Figure 5:
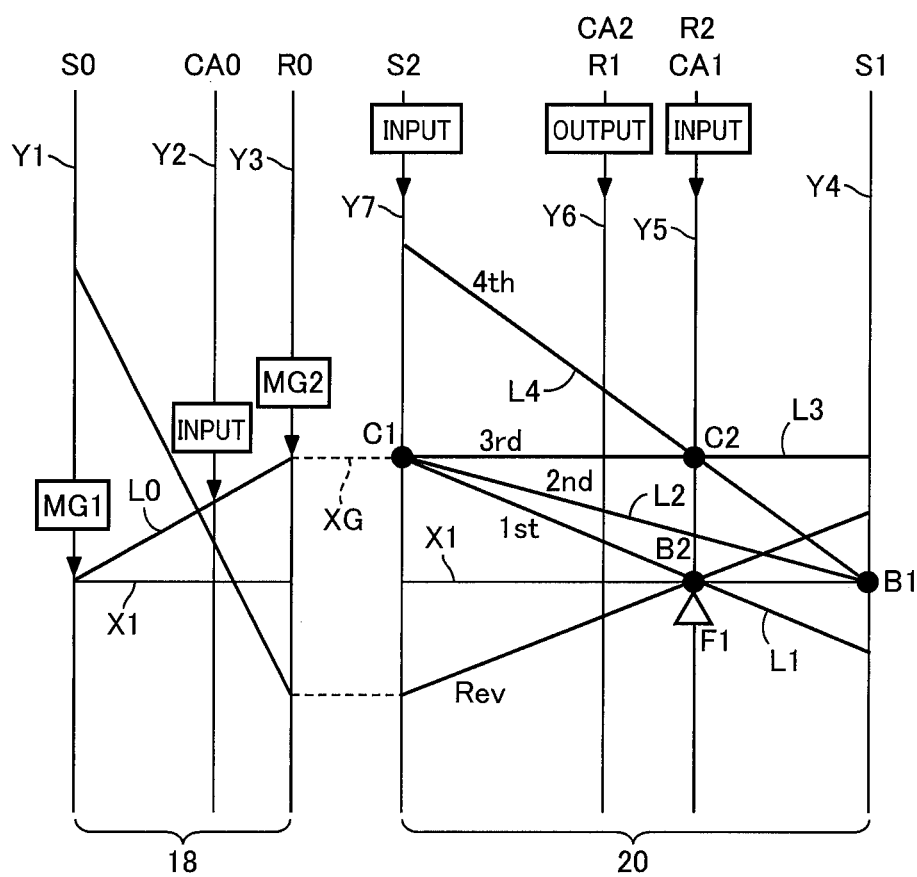
FIG. 5 is a collinear chart in which a relationship among rotational speeds of rotary elements of a drive-force transmitting device can be represented by straight lines, wherein a connection state of each of the rotary elements varies depending a gear position.

FIG. 5 is a collinear chart in which a relationship among rotational speeds of rotary elements of the drive-force transmitting device 14 can be represented by straight lines, wherein a connection state of each of the rotary elements varies depending the established gear position. The collinear chart of FIG. 5 is represented in two-dimensional coordinates in which its horizontal axis represents a relationship among gear ratios of the respective differential mechanism 32, first planetary gear device 36 and second planetary gear device 38 while its vertical axis represents the relationship among the rotational speeds of the rotary elements. A horizontal line X1 indicates a rotational speed of 0, and a horizontal line XG indicates a rotational speed of the intermediate transmitting member 30.

In the collinear chart of FIG. 5, three vertical lines Y1, Y2, Y3 are arranged in this order of description in rightward direction, and represent rotational speeds of the sun gear S0, carrier CA0 and ring gear R0, respectively. An interval between the vertical lines Y1, Y2, Y3 is determined in accordance with the gear ratio of the differential mechanism 32. Further, four vertical lines Y4, Y5, Y6, Y7 are arranged in this order of description in leftward direction, and represent rotational speeds of the sun gear S1, carrier CA1 (ring gear R2), ring gear R1 (carrier CA2) and sun gear S2, respectively. An interval between the vertical lines Y4, Y5, Y6, Y7 is determined in accordance with the gear ratios of the first and second planetary gear devices 36, 38.

In the collinear chart of FIG. 5, when the first speed gear position is established in the step-variable transmission portion 20, with the clutch C1 and the brake B2 (one-way clutch F1) being placed in the respective engaged states, the rotational speed of the output shaft 22 is represented by an intersection between the vertical line Y6 (that represents rotational speeds of the rotary elements connected to the output shaft 22) and a diagonal straight line L1 passing through an intersection between the vertical line Y7 and the horizontal line XG and another intersection between the vertical line Y5 and the horizontal line X1. When the second speed gear position is established in the step-variable transmission portion 20, with the clutch C1 and the brake B1 being placed in the respective engaged states, the rotational speed of the output shaft 22 is represented by an intersection between the vertical line Y6 (that represents rotational speeds of the rotary elements connected to the output shaft 22) and a diagonal straight line L2 passing through the intersection between the vertical line Y7 and the horizontal line XG and another intersection between the vertical line Y4 and the horizontal line X1. When the third speed gear position is established in the step-variable transmission portion 20, with the clutches C1, C2 being placed in the respective engaged states, the rotational speed of the output shaft 22 is represented by an intersection between the vertical line Y6 (that represents rotational speeds of the rotary elements connected to the output shaft 22) and a horizontal straight line L3 passing through the intersection between the vertical line Y7 and the horizontal line XG and another intersection between the vertical line Y5 and the horizontal line XG. When the fourth speed gear position is established in the step-variable transmission portion 20, with the clutch C2 and the brake B1 being placed in the respective engaged states, the rotational speed of the output shaft 22 is represented by an intersection between the vertical line 6 (that represent rotational speeds of the rotary elements connected to the output shaft 22) and a diagonal straight line L4 passing through the intersection between the vertical line Y5 and the horizontal line XG and the intersection between the vertical line Y4 and the horizontal line X1.

As described above, with change of the combination of those of the hydraulically-operated frictional engagement devices CB, which are placed in the engaged states, one of the gear positions established in the step-variable transmission portion 20 is switched to another one.

Referring back to FIG. 1, the vehicle 10 is provided with the ECU 100. The term "ECU" represents "electronic control unit", and consists of first letters of the respective three words. For example, the ECU 100 includes a so-called microcomputer incorporating a CPU, a ROM, a RAM and an input-output interface. The CPU is configured to control the driving apparatus including the engine 12, first and second rotating machines MG1, MG2 and drive-force transmitting device 14 of the vehicle 10, by processing various input signals, according to control programs stored in the ROM, while utilizing a temporary data storage function of the RAM. It is noted that the ECU 100 corresponds to "vehicle control apparatus" recited in the appended claims.

The ECU 100 receives various input signals based on values detected by respective sensors provided in the vehicle 10. Specifically, the electronic control apparatus 90 receives: an output signal of an engine speed sensor 70 indicative of an engine rotational speed Ne [rpm] which is a rotational speed of the engine 12; an output signal of an output speed sensor 72 indicative of an output-shaft rotational speed No [rpm] which is a rotational speed of the output shaft 22 and which corresponds to the running speed V of the vehicle 10; an output signal of a MG1 speed sensor 74 indicative of an MG1 rotational speed Ng [rpm] which is a rotational speed of the first rotating machine MG1; an output signal of a MG2 speed sensor 76 indicative of an MG2 rotational speed Nm [rpm] which is a rotational speed of the second rotating machine MG2; an output signal of an accelerator-opening degree sensor 78 indicative of an acceleration opening degree θacc [%] representing an amount of accelerating operation made by the vehicle driver; an output signal of a throttle-opening degree sensor 80 indicative of a throttle opening degree θth [%]; an output signal of a battery sensor 90 indicative of a battery temperature THba [° C.], a charging/discharging electric current Ibat [A] and a voltage Vbat [V] of the battery 54; an output signal of a fluid temperature sensor 92 indicative of a working fluid temperature THoil [° C.] that is a temperature of a working fluid in the hydraulic control unit 56; and an ignition signal IG of an ignition switch 94 that is to be operated to start the drive force source, wherein the ignition signal IG is indicative of whether the drive force start is to be started or stopped.

The ECU 100 generates various output signals to the various devices provided in the vehicle 10, such as: an engine control command signal Se that is to be supplied to the engine control device 50 for controlling the engine 14; rotating-machine control command signals Smg that are to be supplied to the inverter 52 for controlling the first and second rotating machines MG1, MG2; and a hydraulic control command signal Sat that is to be supplied to the hydraulic control unit 56 for controlling the operation states of the hydraulically-operated frictional engagement devices CB.

The ECU 100 functionally includes a program storage portion 100a, a driving control portion 100b, a learning portion 100c and a learning-data storage portion 100d.

The program storage portion 100a stores therein control programs for controlling the driving apparatus.

The driving control portion 100b is configured to control operations of the engine 12 and first and second rotating machines MG1, MG2, in accordance with the control programs stored in the driving control portion 100b, and to execute a shift control operation for shifting the step-variable transmission 20 from one of the gear positions to another one of the gear positions.

The learning portion 100c is configured to execute learning operations for learning correction values by which control parameters (that are to be used in executions of the control programs) are to be corrected. The learned correction values are stored in the learning-data storage portion 100d that is constituted by, for example, a non-volatile memory. The parameters subjected to the learning operations are corrected by the learned correction values, and the corrected parameters are used as learning values LRN in executions of the control programs.

Hereinafter, as an example of learning of control parameters used in executions of the control programs, there will be described learning of a drive current IDR [A] of one of the linear solenoid valves SL involved in the shift control operation for shifting the step-variable transmission 20 from one of the gear positions to another one of the gear positions.

Figure 6:
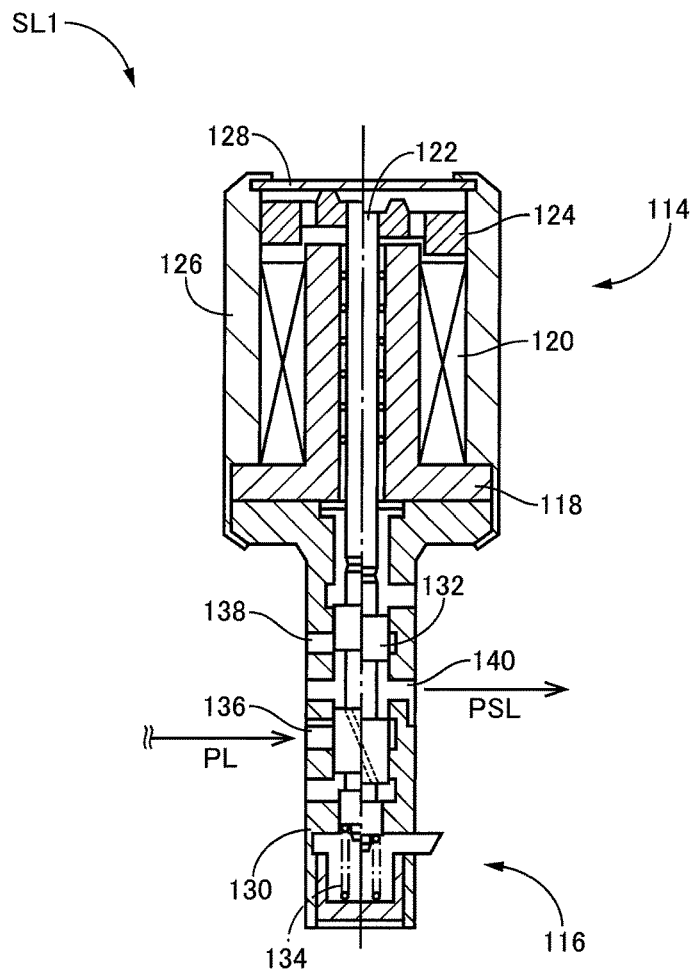
FIG. 6 is a cross sectional view for explaining a construction of a linear solenoid valve provided in the hydraulic control unit.

FIG. 6 is a cross sectional view for explaining a construction of a linear solenoid valve SL provided in the hydraulic control unit 56. FIG. 6 shows, by way of example, the linear solenoid valve SL1 as a representative of the linear solenoid valves SL1-SL4 that are provided in the hydraulic control unit 56, since the linear solenoid valves SL1-SL4 are substantially identical in construction with one another. The linear solenoid valve SL1 includes a solenoid portion 114 configured, when being energized, to covert an electric energy into a drive force, and a regulator portion 116 configured, when being driven by the solenoid portion 114, to regulate the line pressure PL as an input pressure so as to generate a certain output pressure PSL [Pa].

The solenoid portion 114 includes a cylindrical-tubular-shaped winding core 118, a coil 120 constituted by a conductor cable wound on a periphery of the winding core 118, a core 122 provided to be axially movable inside the winding core 118, a plunger 124 fixed to one of axially opposite end portions of the core 122 which is remote from the regulator portion 116, a casing 126 storing therein the winding core 118, coil 120, core 122 and plunger 124, and a cover 128 fitted in an opening of the casing 126.

The regulator portion 116 includes a sleeve 130 fitted in the casing 126, a spool valve element 132 provided to be axially movable inside the sleeve 130, and a spring 134 constantly forces or biases the spool valve element 132 toward the solenoid portion 114. The spool valve element 132 is in contact, at one of axially opposite end portions which is on a side of the solenoid portion 114, with the other of the above-described axially opposite end portions of the core 122, namely, with one of the above-described axially opposite end portions of the core 122, which is on a side of the regulator portion 116.

Figure 7:
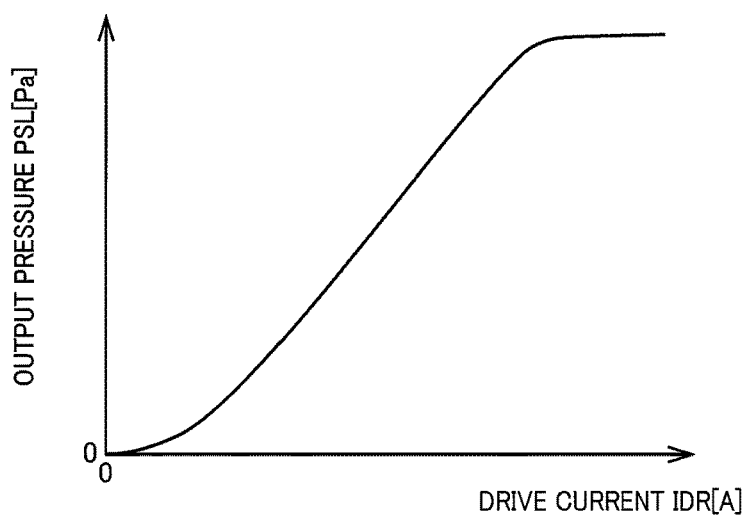
FIG. 7 is a view showing, by way of example, a valve characteristic of the linear solenoid valve in the form of a relationship between a drive current and an output pressure in the linear solenoid valve.

In the solenoid valve SL1 constructed as described above, with the drive current IDR being applied to the coil 120, the plunger 124 is moved by a distance that is dependent on an amount of the applied electric current IDR, in an axial direction of the plunger 124, core 122 and spool 132 that are coaxial with one another, and the core 122 and the spool 132 are moved together with the plunger 124 in the same axial direction. With the axial movement of the spool 132, a rate of flow of the working fluid introduced through an inlet port 136 and a rate of flow of the working fluid discharged through a drain port 138 are adjusted, so that the line pressure PL (original pressure) inputted through the inlet port 136 is regulated to an output pressure PSL corresponding to the drive current IDR, in accordance with the valve characteristic, which is a relationship, as shown in FIG. 7 by way of example, between the drive current IDR and the output pressure PSL. The output pressure PSL is outputted through an outlet port 140.

Figure 8:
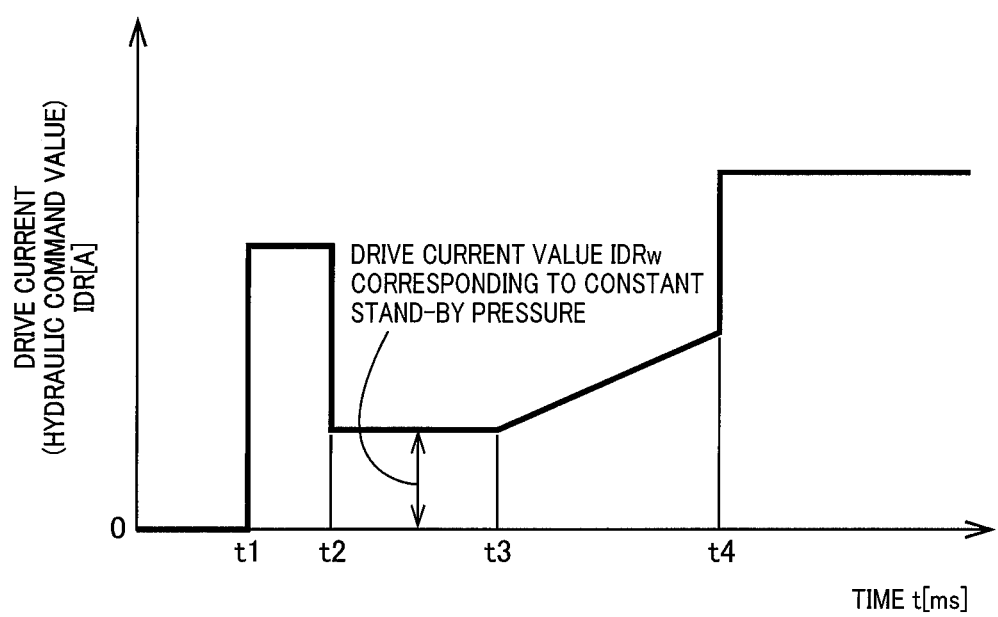
FIG. 8 is a time chart for explaining, by way of example, an operation of the linear solenoid valve during execution of a shifting action of the step-variable transmission portion, more specifically, showing, by way of example, a change of the drive current applied to the linear solenoid valve of the hydraulically-operated frictional engagement device that is to be engaged in the shifting action of the step-variable transmission portion.

FIG. 8 is a time chart for explaining, by way of example, an operation of the linear solenoid valve SL during execution of a shifting action of the step-variable transmission portion 20, more specifically, showing, by way of example, a change of the drive current IDR applied to the linear solenoid valve SL of the engaging-side hydraulically-operated frictional engagement device CB that is to be engaged in the shifting action of the step-variable transmission portion 20. Since the output pressure PSL of the linear solenoid valve SL is dependent on the drive current IDR applied to the linear solenoid valve SL, as shown in FIG. 7, the drive current IDR can be a hydraulic command value for the output pressure PSL.

As shown in FIG. 8, in a period (quick filling period) from a time point t1 to a time point t2, the drive current IDR is temporarily increased to eliminate a pack clearance, namely, so as to initiate an engagement contact of input and output elements of the hydraulically-operated frictional engagement device CB. Then, in a period (constant stand-by pressure period) from the time point t2 to a time point t3, the drive current IDR is kept at a current value corresponding to a constant stand-by pressure by which the engagement device CB is held in its engagement stand-by state. Then, in a period (sweep period) from the time point t3 to a time point t4, the drive current IDR is gradually increased so as to gradually increase the engaging torque of the engagement device CB. At the time point t4 at which a synchronization is determined, the drive current IDR is increased to its maximum value. In the time chart of FIG. 8, a relationship between the drive current IDR and the time t [ms] in process of engagement of the hydraulically-operated frictional engagement device CB is shown, wherein the drive current IDR is one of the above-described control parameters used for the shift control operation for shifting the step-variable transmission portion 20 from one of the gear positions to another one of the gear positions.

There is a variation among the linear solenoid valves SL in terms of the valve characteristic, and there is a variation among the hydraulically-operated frictional engagement devices CB in terms of engagement characteristic, too. Thus, for suppressing influence by the characteristic variations among the linear solenoid valves SL and among the engagement devices CB, the learning operation is executed to correct the drive current IDR applied to the linear solenoid valve SL. For example, a drive current value IDRw [A] corresponding to the constant stand-by pressure of the engaging-side hydraulically-operated frictional engagement device CB is the control parameter subjected to the learning operation. It is noted that the drive current value IDRw corresponding to the constant stand-by pressure of the engaging-side hydraulically-operated frictional engagement device CB corresponds to "hydraulic command value" recited in the appended claims.

The learning operation is categorized into an in-factory learning operation and an in-field learning operation (that may be referred to as "running learning operation"). The in-factory learning operation is to be executed with the engine 12 being operated in a factory, prior to shipment of the vehicle 10, or prior to delivery of the vehicle 10 after the transmission device 40 including the step-variable transmission portion 20 has been repaired or replaced by a new one. The in-field learning operation is to be executed during running of the vehicle 10 after shipment of the vehicle 10 from a factory or after delivery of the vehicle 10 that has been repaired.

The in-factory learning operation is executed to measure a shifting shock in a case in which a standard current value STN [A] is applied as the drive current value IDRw to the linear solenoid valve SL, and to correct the drive current value IDRw for thereby reducing the shifting shock. The shifting shock is caused by a factor such as a tie-up of the step-variable transmission portion 20 and a racing (blowing-up) of the engine rotational speed Ne. For example, a racing amount Neblow [rpm] (see FIG. 9) as a degree of racing of the engine rotational speed Ne is detected as an amount of a temporary increase of the engine rotational speed Ne in process of the shifting action. By execution of the in-factory learning operation, the drive current value IDRw is corrected from the standard current value STN to a corrected current value that is obtained by adding an in-factory correction amount to the standard current value STN. The corrected current value, which is obtained by adding the in-factory correction amount to the standard current value STN, is stored as a pre-learning value P0 [A] before the in-field learning operation, into the learning-data storage portion 100d.

The in-field learning operation is executed based on a result of actual execution of the shift control operation during actual running of the vehicle 10. Specifically, in the execution of the shift control operation during the actual running of the vehicle 10, it is determined whether the racing is caused or not, namely, the racing amount is detected, and the drive current value IDRw of one of the linear solenoid valves SL1-SL4 corresponding to the hydraulically-operated frictional engagement devices CB that is involved in the shifting action, namely, that is released or engaged in the shifting action, is corrected from the pre-learning value P0 to a corrected current value such that the detected degree of racing becomes close to a predetermined target amount. The in-field learning operation, which is executed to correct the drive current value IDRw of the linear solenoid valve SL so as to cause the detected degree of racing to become close to the predetermined target amount, will be described later.

In the in-field learning operation, a correction amount is calculated in each one execution of the learning operation, and the drive current value IDRw is increased or reduced by the calculated correction amount in the learning operation that is executed each time when the shifting action is executed during the running of the vehicle 10. Thus, as a result of repeated execution of the in-field learning operation, the drive current value IDRw is corrected from the pre-learning value P0 to a learning value LRN [A] that is obtained by adding a correction value CMP [A] to the pre-learning value P0, wherein the correction value CMP [A] is a total of the correction amounts that are calculated in the respective executions of the in-field learning operation. As described above, the correction value CMP learned in the in-field learning operation is stored in the learning-data storage portion 100d. With increase of the number Nsft of times of the shifting action, namely, with increase of the number of times of the execution of the in-field learning operation, the corrected drive current value IDRw is eventually converged into a certain range. After the corrected drive current value IDRw has been converged into the certain range, the drive current value IDRw is no longer changed substantially even if the learning operation is more repeated. That is, the drive current value IDRw is eventually held within the certain range even if the learning operation is more repeated after the drive current value IDRw has been converged into the certain range. The drive current value IDRw, which has become little variable, is a converged value Pa of the learning value LRN.

Even after the learning value LRN has been converged, when the number Nsft of times of the shifting action of the step-variable transmission portion 20 has been increased to a large number, the converged value Pa of the learning value LRN becomes to be changed little by little due to wear and deterioration of parts constituting the step-variable transmission portion 20. It is noted the number Nsft of times of the shifting action is a cumulative number of times of the shifting action of the step-variable transmission portion 20, which has been executed together with the execution of the in-field learning operation for learning the correction value CMP, and which has been executed in the same conditions in terms of a combination of the gear positions before and after the shifting action and a range of the throttle valve opening degree θth, after the step-variable transmission portion 20 included in the transmission device 40 provided in the vehicle 10 had been started to be practically used for the first time (for example, after the vehicle 10 had been shipped from a factory, or after the vehicle 10 in which the transmission device 40 including the step-variable transmission portion 20 had been repaired or replaced with a new one had been delivered). The larger the number Nsft of times of the shifting action is, the longer a service period Tuse [h] is, wherein the service period Tuse is a length of time since the step-variable transmission portion 20 of the vehicle 10 has been started to be practically used for the first time. Therefore, the service period Tuse can be an index of the number Nsft of times of the shifting action in the step-variable transmission portion 20 of the vehicle 10. It is noted that the in-field learning operation corresponds to "learning operation" recited in the appended claims.

Figure 9:
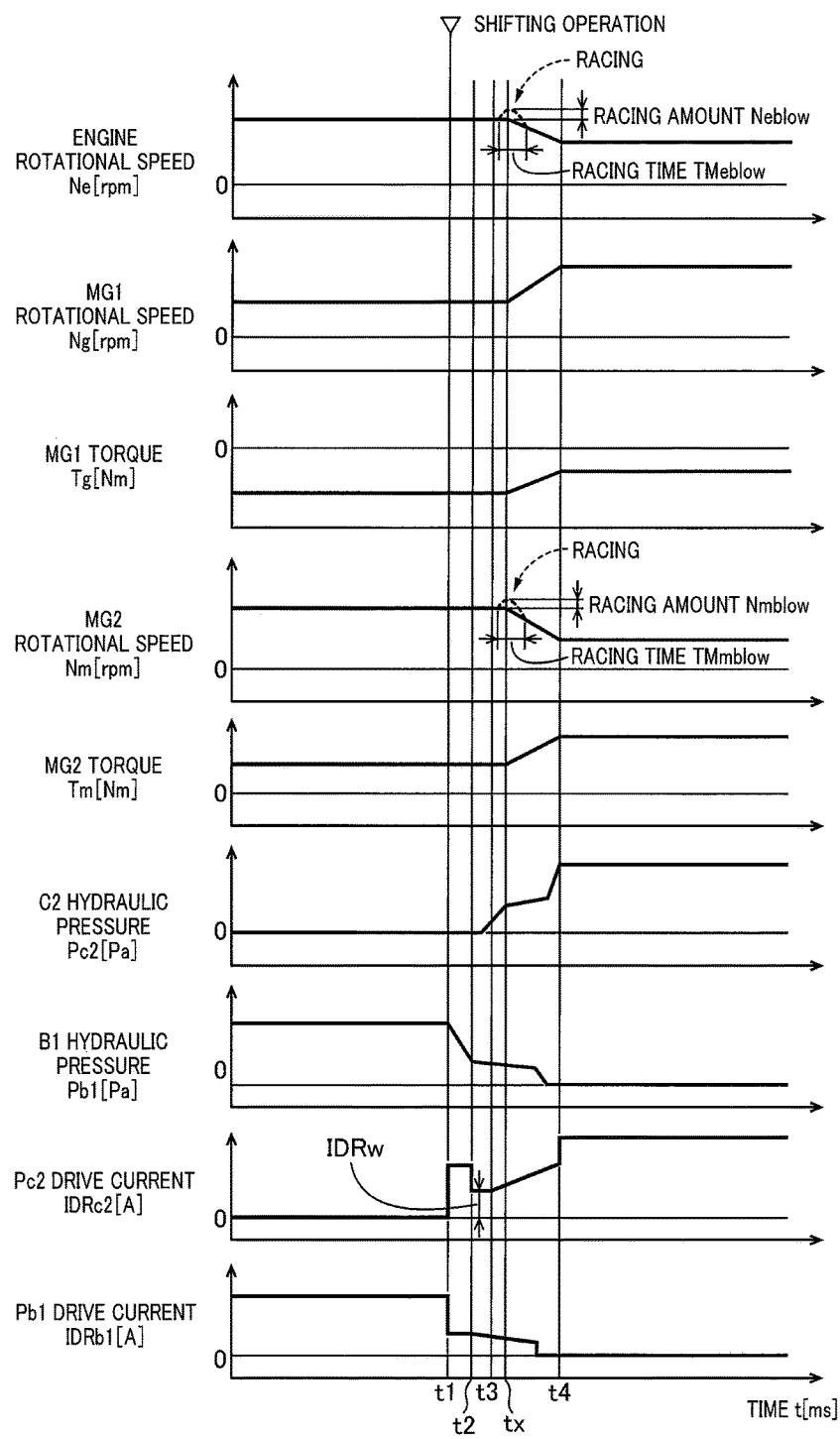
FIG. 9 is a time chart for explaining, by way of example, a in-field learning operation executed when a shift-up action from a second speed gear position to a third speed gear position is executed in the step-variable transmission portion.

FIG. 9 is a time chart for explaining, by way of example, the in-field learning operation executed when a shift-up action from the second speed gear position to the third speed gear position is executed in the step-variable transmission portion 20. In FIG. 9, a state without occurrence of the racing is represented by solid lines, while a state with occurrence of the racing is represented by broken lines. In FIG. 9, its horizontal axes represent a time t [ms], while its vertical axes represent the engine rotational speed Ne, the MG1 rotational speed Ng, the MG1 torque Tg, the MG2 rotational speed Nm, the MG2 torque Tm, a C2 hydraulic pressure Pc2 [Pa] supplied to the hydraulic actuator 62b by which an operation state of the clutch C2 is controlled, a B1 hydraulic pressure Pb1 [Pa] supplied to the hydraulic actuator 62c by which an operation state of the brake B1 is controlled, a Pc2 drive current IDRc2 [A] that is the hydraulic command value for the C2 hydraulic pressure Pc2 and a Pb1 drive current IDRb1 [A] that is the hydraulic command value for the B1 hydraulic pressure Pb1 (as seen from top to bottom). The learning operation is executed for learning the drive current value IDRw (corresponding to the constant stand-by pressure) of the Pc2 drive current IDRc2 for the C2 hydraulic pressure Pc2 supplied to the hydraulic actuator 62b by which the operation state of the clutch C2 as the engaging-side hydraulically-operated frictional engagement device is controlled.

In FIG. 9, a so-called "clutch-to-clutch" shifting operation starts to be executed at a time point t1. In a period from the time point t1 to a time point t4, the Pc2 drive current IDRc2 for the C2 hydraulic pressure Pc2 supplied to the hydraulic actuator 62b by which the operation state of the clutch C2 as the engaging-side hydraulically-operated frictional engagement device is controlled, is changed from a low state to a high state, as shown in the time chart of FIG. 8. Meanwhile, in the period from the time point t1 to the time point t4, the Pb drive current IDRb1 for the B1 hydraulic pressure Pb1 supplied to the hydraulic actuator 62c by which the operation state of the brake B1 as a releasing-side hydraulically-operated frictional engagement device is controlled, is changed from a high state to a low state. At a time point tx (t1<tx<t4) at which the "clutch-to-clutch" shifting operation is executed (i.e., the shift control operation is executed in the step-variable transmission portion 20), the in-field learning operation is executed such that the racing amount Neblow as the degree of racing of the engine rotational speed Ne is held in a predetermined target range (for example, a range defined between a target lower limit value Blowtgt1 [rpm] and a target upper limit value Blowtgt2 [rpm] shown in FIG. 14) including a predetermined target value Blowtgt [rpm]. The predetermined target range for the racing amount Neblow is a range that is determined through experimentation or determined by an appropriate design theory, such that the shifting shock and a length of time required to complete the shifting action are in respective permissible ranges.

Specifically, when the racing amount Neblow is larger than the target upper limit value Blowtgt2 of the predetermined target range, it is assumed that an engaging action of the clutch C2 is delayed relative to a releasing action of the brake B1 thereby causing a certain length of period in which neither the brake B1 nor the clutch C2 has a transmission torque. In this case, there is a risk of generation of the shift shock and increase of the length of time required to complete the shifting action. Therefore, in the next execution of the shift control operation, the drive current value IDRw is made larger than the drive current value IDRw in the present execution of the shift control operation by a correction amount as a predetermined amount by which the drive current value IDRw is to be changed in each one execution of the learning operation. That is, in the next execution of the shift control operation, the drive current value IDRw is made larger than the drive current value IDRw in the present execution of the shift control operation, by the correction amount.

On the other hand, when the racing amount Neblow is smaller than the target lower limit value Blowtgt1 of the predetermined target range, it is assumed that the engaging action of the clutch C2 and the releasing action of the brake B1 overlap with each other thereby causing the tie-up in which both of the brake B1 and the clutch C2 have transmission torques and causing a risk of generation of the shifting shock. Therefore, in the next execution of the shift control operation, the drive current value IDRw is made smaller than the drive current value IDRw in the present execution of the shift control operation by the correction amount as the predetermined amount by which the drive current value IDRw is to be changed in each one execution of the learning operation. That is, in the next execution of the shift control operation, the drive current value IDRw is made smaller than the drive current value IDRw in the present execution of the shift control operation, by the correction amount.

When the racing amount Neblow is within the predetermine target range, the "clutch-to-clutch" shifting operation is executed with the shifting shock and the length of time required to complete the shifting action being in the respective permissible ranges, so that the drive current value IDRw is not corrected or changed. Therefore, in the next execution of the shift control operation, the drive current value IDRw is made equal to the drive current value IDRw in the present execution of the shift control operation.

The in-field learning operation is executed for each of all running ranges, i.e., for each of all ranges of the throttle valve opening degree θth (or the accelerator opening degree θacc), so that the in-field learning operation is executed for each of the ranges in a repeated manner, and the correction value CMP as the total of the correction amounts in the respective executions of the in-field learning operation is learned and stored for each of the ranges of the throttle valve opening degree θth (or the accelerator opening degree θacc).

FIG. 10 is a view showing, by way of examples, the correction value CMP of the Pc2 drive current IDRc2 that has been learned in executions of the shift-up action from the second speed gear position to the third speed gear position in the step-variable transmission portion 20, wherein the correction value CMP is stored for each range of the throttle valve opening degree θth. As shown in FIG. 10, the throttle valve opening degree θth is divided into four ranges that consist of a range not smaller than 0[%] and smaller than 25[%], a range not smaller than 25[%] and smaller than 50[%], a range not smaller than 50[%] and smaller than 75[%], and a range not smaller than 75[%] and not larger than 100[%]. For the four ranges of the throttle valve opening degree θth, the respective correction values CMP, i.e., a value ΔPc2-1, a value ΔPc2-2, a value ΔPc2-3 and a value ΔPc2-4 are learned by the in-field learning operation. The drive current value IDRw, which is the parameter that is to be used in execution of a corresponding one of the control programs, is corrected by a corresponding one of the correction values CMP (the value ΔPc2-1, value ΔPc2-2, value ΔPc2-3 and value ΔPc2-4) learned by the in-field learning operation, for each range of the throttle valve opening degree θth. It is noted that not only the drive current value IDRw corresponding to the constant stand-by pressure of the engaging-side hydraulically-operated frictional engagement device CB in case of shifting action of the step-variable transmission portion 20 from the second speed gear position to the third speed gear position but also that in case of shifting action of the step-variable transmission portion 20 from any other position other than the second speed gear position to another gear position is the parameter subjected to the learning operation for each range of the throttle valve opening degree θth. Thus, there are plurality of parameters subjected to the learning operation, and the correction value CMP is learned for each one of the plurality of parameters. Repeated executions of the in-field learning operation described above correspond to "EXECUTING NORMAL LEARNING" at step S60 shown in FIG. 12 and at step S200 shown in FIG. 15, which are described below.

As shown in FIG. 1, the ECU 100 functionally includes a transmitting/receiving portion 100e, a reset determination portion 100f, a variation determination portion 100g and an initial-value setting portion 100h.

When the learning value LRN is converged, the transmitting/receiving portion 100e transmits information related to the in-field learning operation, to a server 160 via the transceiver 98, wherein the information related to the in-field learning operation includes: the pre-learning value P0, the learning value LRN; an attribute information of the vehicle 10 (such as vehicle type and running distance Drun [km]); the combination of the gear positions before and after the shifting action of the step-variable transmission portion 20 subjected to the learning operation; the number Nsft of times of the shifting action for the same combination of the gear positions; and a range of the throttle valve opening degree θth subjected to the learning operation.

The above-described running distance Drun is a running distance of the vehicle 10 for which the vehicle 10 has run since the step-variable transmission portion 20 included in the transmission device 40 provided in the vehicle 10 had been started to be practically used for the first time.

The server 160 obtains the above-described information related to the in-field learning operation not only from the own vehicle 10 but also from the other vehicles 610 provided with respective transmission devices 40 each of which is the same in type as the transmission device 40 provided in the own vehicle 10. That is, the in-field learning operation is executed also in each of the other vehicles 610, and the information related to the in-field learning operation is transmitted to the server 160 also from each of the other vehicles 610. The above-described "type" is interpreted to mean a particular type or model that is categorized depending on a basic construction and external shape. In the vehicles provided with the transmission devices 40 that are the same in type, the transmission devices 40 are controlled in accordance with the same control programs, and the control parameters used in execution of the control programs are also the same.

The server 160 is a computer including, for example, a CPU and a storage device. The CPU obtains the information related to the in-field learning operation from a plurality of vehicles in each of which the in-field learning operation has been executed, wherein the plurality of vehicles include the own vehicle 10 and the other vehicles 610. Then, the CPU processes the obtained information related to the in-field learning operation and supplies the processed information to the own vehicle 10 and the other vehicles 610, wherein the processing and supply of the information are made in accordance with programs. The storage device is provided to store therein the obtained and processed information.

Hereinafter, there will be described the processing of the information related to the in-field learning operation, which is obtained by the server 160. A data set of the pre-learning values P0 obtained by the server 160 from the above-described plurality of vehicles will be referred to as "data set GP0". A data set of the converged values Pa [A] of the respective learning values LRN obtained by the server 160 from the plurality of vehicles will be referred to as "data set GPa". The data set GP0 and the data set GPa are so-called big data.

The server 160 divides the data set GP0 into a plurality of groups, such that the pre-learning values P0 belonging to each one of the groups are the same as each other in terms of the combination of the gear positions subjected to the learning operation and the range of the throttle valve opening degree θth subjected to the learning operation, and calculates an average P0ave that is an arithmetic mean of the pre-learning values P0 belonging to each one of the groups. Then, the server 160 stores therein the calculated average P0ave. The number Nsft of times of the shifting action of the step-variable transmission portion 20 is grouped into, for example, a plurality of number ranges. Further, the server 160 divides the data set GPa into a plurality of groups, such that the converged values Pa [A] belonging to each one of the groups are the same as each other in terms of the combination of the gear positions subjected to the learning operation, the number range of the shifting action for the same combination of the gear positions, and the range of the throttle valve opening degree θth subjected to the learning operation, and calculates an average Paave that is an arithmetic mean of the converged values Pa belonging to each one of the groups and a variance Var that is a degree of variation among the converged values Pa belonging to each one of the groups. Then, the server 160 stores therein the calculated average Paave and variance Var. A standard deviation, which is a positive square root of the variance Var, also represents the degree of variation of the converged values Pa. It is noted that the variance Var corresponds to "degree of variation" recited in the appended claims, the average Paave corresponds to "average of the converged values" recited in the appended claims, and the average P0ave corresponds to "average of pre-learning values of the control parameters in the plurality of vehicles" recited in the appended claims.

Figure 11:
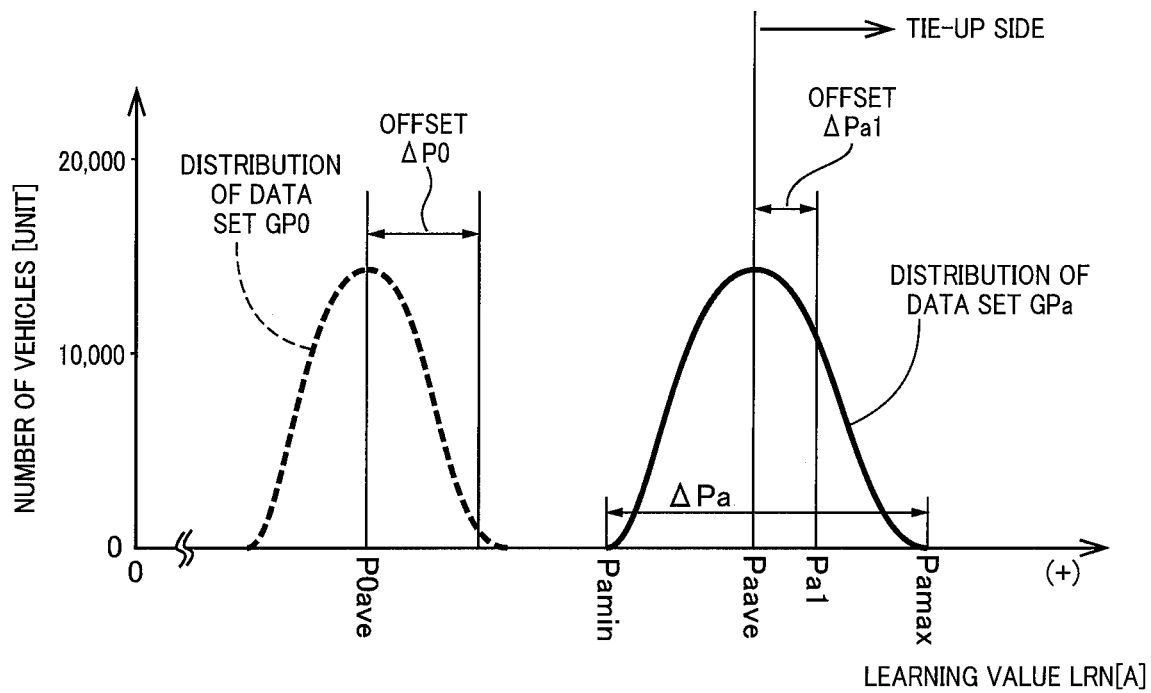
FIG. 11 is a view showing, by way of example, information related to the in-field learning operation in case of the shift-up action from the second speed gear position to the third speed gear position is executed in the step-variable transmission portion.

FIG. 11 is a view showing, by way of example, the information related to the in-field learning operation in case of the shift-up action from the second speed gear position to the third speed gear position is executed in the step-variable transmission portion 20. In FIG. 11, broken line represents distribution of the pre-learning values P0 in the data set GP0, while solid line represents distribution of the converged values Pa of the data set GPa. In general, with increases of numbers of the pre-learning values P0 in the data set GP0 and the converged values Pa of the data set GPa, each of the distributions of the pre-learning values P0 and the converged values Pa becomes close to a normal distribution.

The transmitting/receiving portion 100e obtains, from the server 160 via the transceiver 98, data related to the data set GP0 and the data set GPa, more precisely, processed data of one of the above-described groups of the data set GP0 and one of the above-described groups of the data set GPa that are substantially the same as the own vehicle 10 in terms of the combination of the gear positions subjected to the learning operation, the number range of the shifting action for the same combination of the gear positions, and the range of the throttle valve opening degree θth subjected to the learning operation, wherein the processed data include the average P0ave of the pre-learning values P0 belonging to the above-described one of the groups of the data set GP0 and the average Paave and the variance Var of the converged values Pa belonging to the above-described one of the groups of the data set GPa. Thus, the transmitting/receiving portion 100e extracts, from among the above-described plurality of vehicles, at least one vehicle that is different from the own vehicle 10 by a predetermined value or less in the number Nsft of times of the shifting action in the step-variable transmission portion 20, and then obtains the above-described processed data of each of the at least one vehicle. That is, the transmitting/receiving portion 100e extracts, from among the plurality of vehicles, at least one vehicle that is similar to the own vehicle 10 in terms of the number Nsft of times of the shifting action in the step-variable transmission portion 20, and then obtains the above-described processed data of each of the at least one vehicle. It is noted that the above-described predetermined value regarding the number Nsft of times of the shifting action is a predetermined value that is determined through experimentation or determined by an appropriate design theory, such that the at least one vehicle (that is different from the own vehicle 10 by the predetermined value or less in the number Nsft of times of the shifting action) is almost the same as the own vehicle 10 in terms of influence affected by the wear and deterioration of the parts constituting the step-variable transmission portion 20 so that it is considered that the at least one vehicle is close to the own vehicle 10 in terms of the converged value Pa of the learning value LRN. The data related to the data set GP0 and the data set GPa, which are obtained by the transmitting/receiving portion 100e, may include, for example, also the pre-learning value P0 in the own vehicle 10 before the transmission device 40 including the step-variable transmission portion 20 has been repaired or replaced by a new one and the converged value Pa of an own-vehicle learning value LRNown in the own vehicle 10 after the in-field learning operation has been executed. It is noted that the transmitting/receiving portion 100e corresponds to "obtaining portion" recited in the appended claims, and the processed data obtained by the transmitting/receiving portion 100e correspond to "information related to converged values of learning values of control parameters in a plurality of vehicles provided with respective control-subject components each of which is the same in type as the control-subject component provided in the vehicle" recited in the appended claims.

The reset determination portion 100f determines whether the own-vehicle learning value LRNown, i.e., the learning value LRN in the own vehicle 10, is to be reset or not. The reset determination portion 100f determines that the own-vehicle learning value LRNown is to be reset, for example, (1) when the own vehicle 10 has been shipped and the step-variable transmission portion 20 included in the transmission device 40 provided in the own vehicle 10 has been started to be practically used for the first time, (2) when the transmission device 40 of the own vehicle 10 including the step-variable transmission portion 20 and the linear solenoid valves SL has been repaired or replaced with a new one, (3) the control program in accordance with which the transmission device 10 of the own vehicle 10 is controlled has been version-upped or updated, and/or (4) the own-vehicle learning value LRNown has become an unexpected value that is outside a permissible range from a design point of view. The resetting the own-vehicle learning value LRNown is to delete the own-vehicle learning value LRNown stored in the learning-data storage portion 100d and cause the initial-value setting portion 100h to set the own-vehicle learning value LRNown to an initial value INIT.

The variation determination portion 100g determines whether the variance Var of the converged values Pa of the data set GPa obtained from the server 160 is smaller than a threshold value Varj or not. The threshold value Varj is a predetermined value for determining whether the degree of variation among the converged values Pa of the data set GPa is small enough to make it possible to consider that the converged value Pa of the own-vehicle learning value LRNown as a result of execution of the learning operation after the reset of the own-vehicle learning value LRNown is most likely to be a value close to the average Paave of the converged values Pa of the data set GPa. It is noted that the threshold value Varj corresponds to "threshold value" recited in the appended claims.

When it is determined by the variation determination portion 100g that the variance Var among the converged values Pa of the data set GPa is smaller than the threshold value Varj, the initial-value setting portion 100h determines an initial value INIT [A] to which the own-vehicle learning value LRNown is to be reset, based on the average Paave of the converged values Pa of the data set GPa. For example, the initial-value setting portion 100h sets the initial value INIT to a first learning value Pa1 that is dependent on the average Paave of the converged values Pa of the data set GPa, more precisely, that is different from the average Paave by a certain offset value ΔPa1 [A] and is offset from the average Paave toward a tie-up side, namely, toward a maximum value Pamax (see FIG. 11) that maximizes a speed at which the clutch C2 as the engaging-side hydraulically-operated frictional engagement device is to be placed in the engaged state. The maximum value Pamax is a tie-up side end of distribution of the converged values Pa of the data set GPa. The certain offset value ΔPa1 is a value not larger than a difference between the average Paave and the maximum value Pamax, and is a standard deviation+SD (deviated toward the tie-up side, i.e., positive side) of the converged values Pa of the data set GPa, for example. It is preferable that the initial value INIT (to which the own-vehicle learning value LRNown is to be reset) is set to a value dependent on the average Paave of the converged values Pa of the data set GPa, when it is estimated that a width (absolute value of the correction value CMP) change of the correction value CMP is relatively large in the in-field learning operation due to factors such as an individual difference between the transmission devices 40 of the same type, and wear and deterioration of component parts of the step-variable transmission portion 20 included in the transmission device 40, which could be caused by break-in driving in an initial stage of the service period Tuse. It is estimated that the width of change of the correction value CMP is relatively large in the in-field learning operation, when a difference (absolute value) between the average P0ave of the pre-learning values P0 of the data set GP0 and the average Paave of the converged values Pa of the data set GPa is larger than a predetermined value. This predetermined value is determined through experimentation or determined by an appropriate design theory, such that this predetermined value is considered as a value effective to reduce the number of times of execution of the in-field learning operation after the reset of the own-vehicle learning value LRNown.

On the other hand, when it is determined by the variation determination portion 100g that the variance Var among the converged values Pa of the data set GPa is not smaller than the threshold value Varj, the initial-value setting portion 100h sets the initial value INIT (to which the own-vehicle learning value LRNown is to be reset) to the average P0ave of the pre-learning values P0 in the data set GP0, for example. It is noted that the average P0ave as the initial value INIT, to which the own-vehicle learning value LRNown is to be reset when it is determined that the variance Var among the converged values Pa of the data set GPa is not smaller than the threshold value Varj, corresponds to "second learning value" recited in the appended claims.

Figure 12:
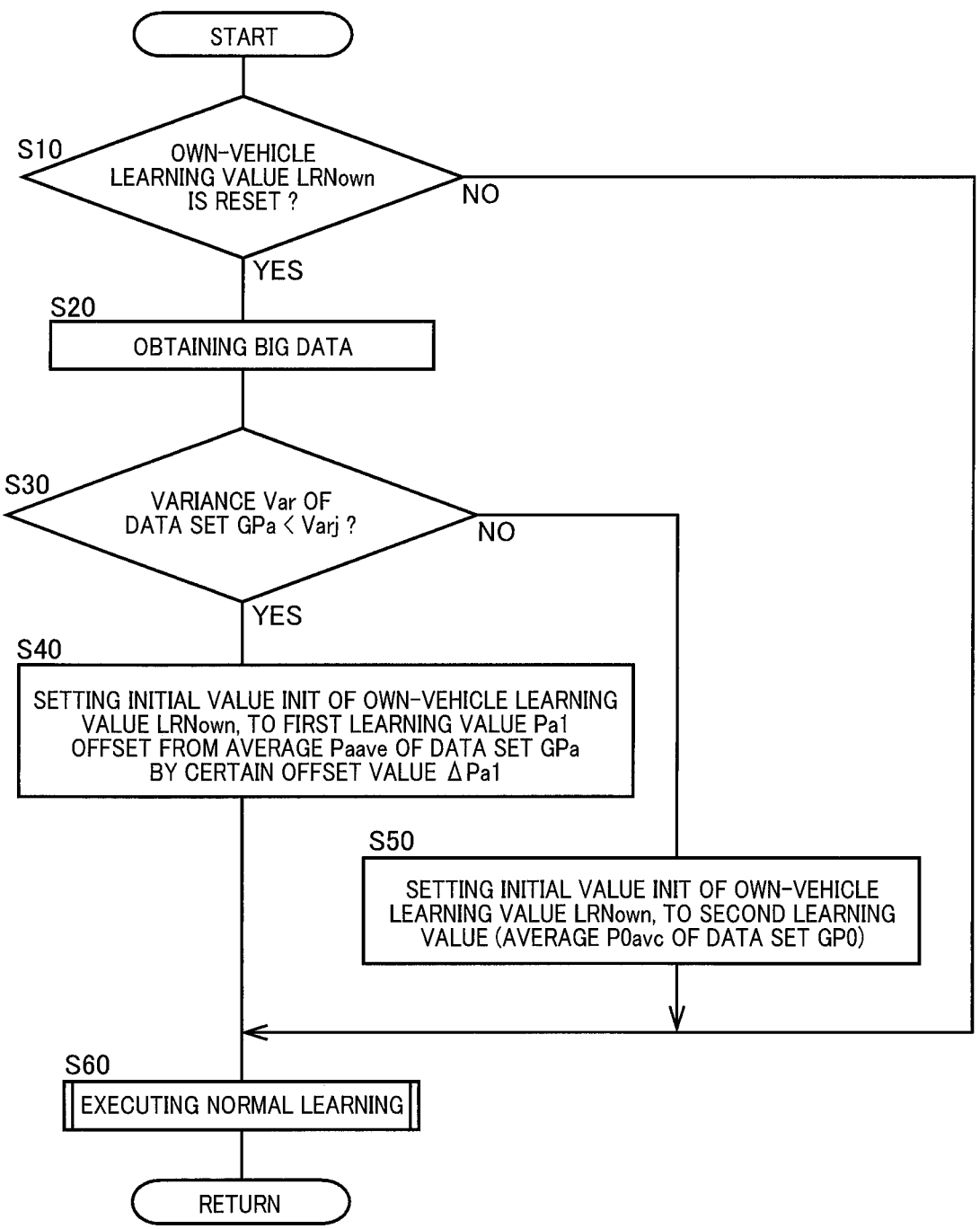
FIG. 12 is a flow chart showing, by way of example, a control routine executed by the ECU shown in FIG. 1, for explaining a major portion of a control operation of the ECU for the driving apparatus.

FIG. 12 is a flow chart showing a control routine executed by the ECU 100 that is shown in FIG. 1, for explaining a major portion of a control operation of the ECU 100. This control routine is executed in a repeated manner.

The control routine is initiated with step S10 corresponding to function of the reset determination portion 100f, which is implemented to determine whether the own-vehicle learning value LRNown is to be reset or not. When an affirmative determination is made at step S10, step S20 is implemented. When a negative determination is made at step S10, the control flow goes to step S60.

At step S20 corresponding to function of the transmitting/receiving portion 100e, the processed data of the data set GP0 and data set GPa are obtained from the server 160. Step S20 is followed by step S30.

At step S30 corresponding to function of the variation determination portion 100g, it is determined whether the variance Var among the converged values Pa of the data set GPa is smaller than the threshold value Varj or not. When an affirmative determination is made at step S30, step S40 is implemented. When a negative determination is made at step S30, the control flow goes to step S50.

At step S40 corresponding to function of the initial-value setting portion 100h, the initial value INIT, to which the own-vehicle learning value LRNown is to be reset, is set to the first learning value Pa1. Step S40 is followed by step S60.

At step S50 corresponding to function of the initial-value setting portion 100h, the initial value INIT, to which the own-vehicle learning value LRNown is to be reset, is set to the second learning value in the form of the average P0ave of the pre-learning values P0 in the data set GP0. Step S50 is followed by step S60.

At step S60 corresponding to function of the learning portion 100c, the in-field learning operation is repeatedly executed whereby the own-vehicle learning value LRNown is corrected to be converged into the certain range. When step S60 has been implemented, one cycle of execution of the control routine is terminated.

In the present embodiment, there are provided: (a) the reset determination portion 100f configured to determine whether the own-vehicle learning value LRNown of the control parameter is to be reset to the initial value INIT or not; (b) the transmitting/receiving portion 100e configured to obtain the information (such as the converged values Pa in the data set GPa) related to the converged values Pa of the learning values LRN of the control parameters in the plurality of vehicles provided with the respective transmission devices 40 which are the same in type as the transmission device 40 provided in the own vehicle 10 and which are controlled by using the respective learning values LRN in the respective vehicles; (c) the variation determination portion 100g configured to determine whether the variance Var among the converged values Pa of the data set GPa in the respective vehicles is smaller than the threshold value Varj or not; and (d) the initial-value setting portion 100h configured to set the initial value INIT to the first learning value Pa1 that is offset, by the certain offset value ΔPa1, from the average Paave of the converged values Pa in the data set GPa toward the tie-up side, when it is determined by the variation determination portion 100g that the variance Var is smaller than the threshold value Varj and it is determined by the reset determination portion 100f that the own-vehicle learning value LRNown is to be reset to the initial value INIT. In a case in which the variance Var among the converged values Pa in the respective vehicles (provided with the respective transmission devices 40 each of which is the same in type as the transmission device 40 provided in the own vehicle 10) is small, there is a high probability that the own-vehicle learning value LRNown in the own vehicle 10 is converged to a value close to the average Paav of the converged values Pa of the data set GPa in the respective vehicles by the learning operation executed after the own-vehicle learning value LRNown has been reset to the initial value INIT. Therefore, in the case in which the variance Var among the converged values Pa of the data set GPa in the respective vehicles is small, the initial-value setting portion 100h sets the initial value INIT to the first learning value Pa1 that is likely to be a value close to a converged value of the own-vehicle learning value LRNown in the own vehicle 10. Owing to these arrangements, it is possible to cause the own-vehicle learning value LRNown to be quickly converged by a smaller number of times of execution of the learning operation, whereby the controllability of the vehicle 10 can be quickly improved after the reset of the learning value. That is, it is possible to early cause the vehicle to be controlled in a state in which variations of characteristics of component parts of the vehicle 10 (such as variation of the valve characteristics of the linear solenoid valves SL and variation of the engagement characteristics of the hydraulically-operated frictional engagement devices CB) are suppressed by execution of the in-field learning operation.

In the present embodiment, the initial-value setting portion 100h is configured to set the initial value INIT to the average P0ave of the pre-learning values P0 (data set GP0) of the control parameters in the respective vehicles, when it is determined by the variation determination portion 100g that the variance Var is not smaller than the threshold value Varj and it is determined by the reset determination portion 100f that the own-vehicle learning value LRNown is to be reset to the initial value INIT. In the case in which the variance Var among the converged values Pa of the data set GPa in the respective vehicles is large, it is doubtful that there is the high probability that the own-vehicle learning value LRNown in the own vehicle 10 is converged to the value close to the average Paave of the converged values Pa of the data set GPa in the respective vehicles when the own-vehicle learning value LRNown has been reset to the initial value INIT. Therefore, in the case in which the variance Var among the converged values Pa of the data set GPa in the respective vehicles is large, the initial-value setting portion 100h sets the initial value INIT to the average P0ave of the pre-learning values P0, rather than to the first learning value Pa1 that is doubtful to be a value close to the converged value of the own-vehicle learning value LRNown in the own vehicle 10. Thus, it is possible to early improve the controllability of the vehicle 10 after the own-vehicle learning value LRNown has been reset to the initial value INIT.

In the present embodiment, the transmission device 40 includes the step-variable transmission portion 20, and the control parameter subjected to the learning operation is the drive current value IDRw by which the step-variable transmission portion 20 is to be controlled to be placed in a selected one of the gear positions. Owing to this arrangement, it is possible to early improve issues such as the shifting shock that could be caused in the shifting action in the step-variable transmission portion 20 after the reset of the own-vehicle learning value LRNown.

In the present embodiment, the first learning value Pa1 is offset toward the tie-up side by the certain offset value ΔPa1, so that it is possible to suppress seizing of the hydraulically-operated frictional engagement device CB, bearings and other components provided in the drive-force transmitting path PT, which could be caused in the event of an excessive racing of the engine 12 shortly after the own-vehicle learning value LRNown has been reset to the initial value INIT.

In the present embodiment, the in-field learning operation is executed, based on the racing amount Neblow as the degree of racing of the drive force source of the vehicle 10 in execution of the shift control operation for shifting the step-variable transmission portion 20 from the one of the gear positions to the another one of the gear positions. Owing to this arrangement in which the in-field learning operation is executed based on the racing amount Neblow, it is possible to set the drive current value IDRw (by which the step-variable transmission portion 20 is to be controlled to be placed in a selected one of the gear positions in execution of the "clutch-to-clutch" shifting operation), to a value by which the shifting shock and the length of time required to complete the shifting action can be in respective permissible ranges.

In the present embodiment, the transmitting/receiving portion 100e is configured to obtain the information (such as the processed data of the data set GP0 and data set GPa) related to the converged values Pa of the learning values LRN of the control parameters in at least one of the plurality of vehicles, wherein each of the at least one of the plurality of vehicles is different from the own vehicle 10 by the predetermined value or less in terms of the number Nsft of times of the shifting action in the step-variable transmission portion 20. The average Paave of the converged values Pa of the data set GPa in the above-described at least one of the plurality of vehicles that is similar to the own vehicle 10 in terms of the number Nsft of times of the shifting action in the step-variable transmission portion 20, is more likely to be a value close to the converged value of the own-vehicle learning value LRNown in the own vehicle 10, as compared with an average of the converged values Pa of the other vehicles that are not similar to the own vehicle 10 in terms of the number Nsft of times of the shifting action in the step-variable transmission portion 20, namely, as compared with the processed data of the data set GP0 and data set GPa including data representing the number Nsft of times of the shifting action which is not close to that in the own vehicle 10. This is because it is considered that the above-described at least one of the plurality of vehicles (that is similar to the own vehicle 10 in terms of the number Nsft of times of the shifting action in the step-variable transmission portion 20) is almost the same as the own vehicle 10 in terms of influence affected by the wear and deterioration of the parts constituting the step-variable transmission portion 20 included in the transmission device 40. Therefore, it is possible to more reliably cause the own-vehicle learning value LRNown to be quickly converged by a smaller number of times of execution of the learning operation, whereby the controllability of the vehicle 10 can be further quickly improved after the reset of the learning value.

In the present embodiment, the variation determination portion 100g is configured to determine whether the degree of variation among the converged values Pa of the data set GPa in the respective vehicles is smaller than the threshold value Varj or not, by determining whether the variance Var among the converged values Pa of the data set GPa in the respective vehicles is smaller than the threshold value Varj or not. By using the variance Var as an index representing the degree of variation, the degree of variation among the converged values Pa of the data set GPa can be accurately determined, even if peculiar data are included in a distribution of the converged values Pa of the data set GPa.

Second Embodiment

Figure 13:
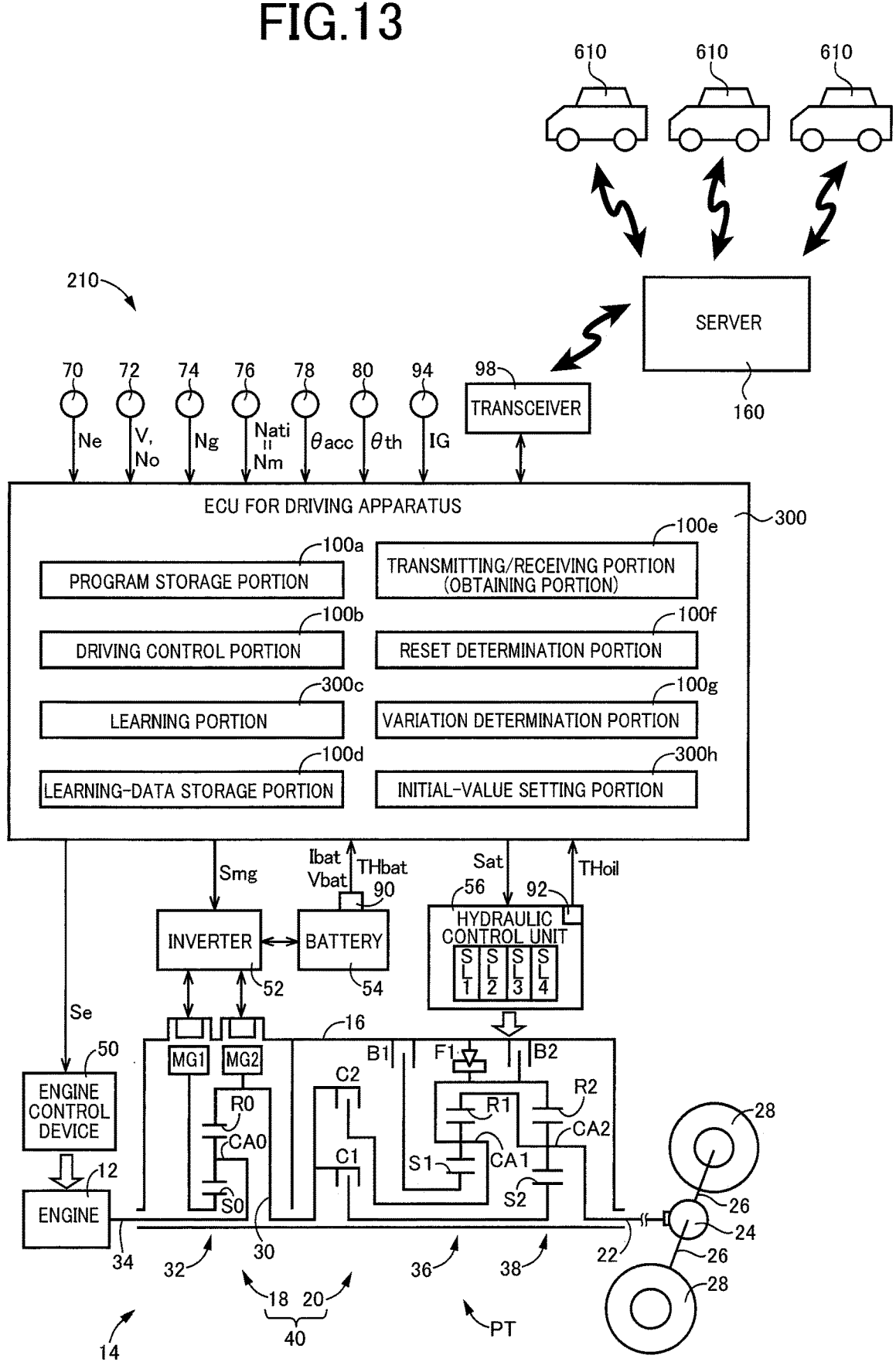
FIG. 13 is a view schematically showing a construction of a vehicle provided with an ECU for a driving apparatus, which is constructed according to a second embodiment of the present invention, and is a functional block diagram showing major portions of control functions for various control operations executed in the vehicle.

FIG. 13 is a view schematically showing a construction of a vehicle 210 provided with an ECU 300 for a driving apparatus, which is constructed according to a second embodiment of the present invention, and is a functional block diagram showing major portions of control functions for various control operations executed in the vehicle 210. FIG. 13 shows also the other vehicles 610 that are other than the vehicle 210 (that will be referred to as "own vehicle 210" where the vehicle 210 is to be particularly distinguished from the other vehicles 610). The vehicle 210 has substantially the same construction as the vehicle 10 in the above-described first embodiment, and is different from the vehicle 10 in that the ECU 300 is provided in place of the above-described ECU 100. Therefore, in the following description of this second embodiment, there will be described mainly elements different from the first embodiment. The same reference signs as used in the first embodiment will be used in the following second embodiment, to identify the functionally corresponding elements, and descriptions thereof are not provided. It is noted that the own vehicle 210 and the other vehicles 610 cooperate to constitute "a plurality of vehicles" recited in the appended claims.

As shown in FIG. 13, the ECU 300 functionally includes a learning portion 300c and an initial-value setting portion 300h, in addition to the program storage portion 100a, driving control portion 100b, learning-data storage portion 100d, transmitting/receiving portion 100e, reset determination portion 100f and variation determination portion 100g. It is noted that the ECU 300 corresponds to "vehicle control apparatus" recited in the appended claims.

The learning portion 300c learns the correction value by which the control parameter (that is used in execution of the control program) is to be corrected. Regarding the in-factory learning operation, the learning portion 300c has substantially the same function as the learning portion 100c in the first embodiment. Regarding the in-field learning operation, the learning portion 300c has substantially the same function as the learning portion 100c in the first embodiment, but is different from the learning portion 100c in that the correction amount in each one execution of the learning operation varies depending on which one of conditions (1)-(3) described below is satisfied.

The condition (1) is that the own-vehicle learning value LRNown in the own vehicle 210 is before being reset, and is that the own-vehicle learning value LRNown has been reset and the variance Var among the converged values Pa of the data set GPa is not smaller than the threshold value Varj. The condition (2) is that the own-vehicle learning value LRNown has been reset, the variance Var among the converged values Pa of the data set GPa is smaller than the threshold value Varj, a difference (=|Blowtgt−Neblow|) between the target value Blowtgt and the racing amount Neblow is larger than a threshold difference value ΔBlow (>0) [rpm], and the own-vehicle learning value LRNown is corrected to be changed in a direction away from the initial value INIT toward the average Paave of the converged values Pa of the data set GPa. The condition (3) is that the own-vehicle learning value LRNown has been reset, the variance Var among the converged values Pa of the data set GPa is smaller than the threshold value Varj, the difference between the target value Blowtgt and the racing amount Neblow is larger than the threshold difference value ΔBlow, and the own-vehicle learning value LRNown is corrected to be changed in an opposite direction opposite to the direction away from the initial value INIT toward the average Paave of the converged values Pa of the data set GPa, and is that the own-vehicle learning value LRNown has been reset, the variance Var among the converged values Pa of the data set GPa is smaller than the threshold value Varj, the difference between the target value Blowtgt and the racing amount Neblow is not larger than the threshold difference value ΔBlow.

In a case in which the condition (1) is satisfied, the correction amount in each one execution of the learning operation by the learning portion 300c is, for example, the same as the correction amount in each one execution of the learning operation by the learning portion 100c in the above-described first embodiment.

In a case in which the condition (2) is satisfied, the correction amount in each one execution of the learning operation by the learning portion 300c is larger than that in a case in which the condition (3) is satisfied, and is larger than, for example, the correction amount in each one execution of the learning operation by the learning portion 100c in the above-described first embodiment. Thus, in the case of satisfaction of the condition (2), the learning portion 300c executes, as the in-field learning operation, a high-speed learning by which the learning is carried out at a higher speed, namely, the own-vehicle learning value LRNown is converged by a smaller number of times of execution of the learning operation, as compared with in the case of satisfaction of the condition (3).

In the case in which the condition (3) is satisfied, the correction amount in each one execution of the learning operation by the learning portion 300c is smaller than that in the case in which the condition (2) is satisfied, and is smaller than, for example, the correction amount in each one execution of the learning operation by the learning portion 100c in the above-described first embodiment. Thus, in the case of satisfaction of the condition (3), the learning portion 300c executes, as the in-field learning operation, a standard-speed learning by which the learning is carried out at a lower speed, namely, the own-vehicle learning value LRNown is converged by a larger number of times of execution of the learning operation, as compared with in the case of satisfaction of the condition (2).

In the high-speed learning, the correction amount in each one execution of the learning operation is larger than in the standard-speed learning. In the standard-speed learning, the correction amount in each one execution of the learning operation is smaller than in the high-speed learning.

The initial-value setting portion 300h sets the initial value INIT (to which the own-vehicle learning value LRNown is to be reset), to, for example, the average P0ave of the pre-learning values P0 in the data set GP0, irrespective of the determination by the variation determination portion 100g as to whether the variance Var among the converged values Pa of the data set GPa is smaller than the threshold value Varj or not.

Figure 14:
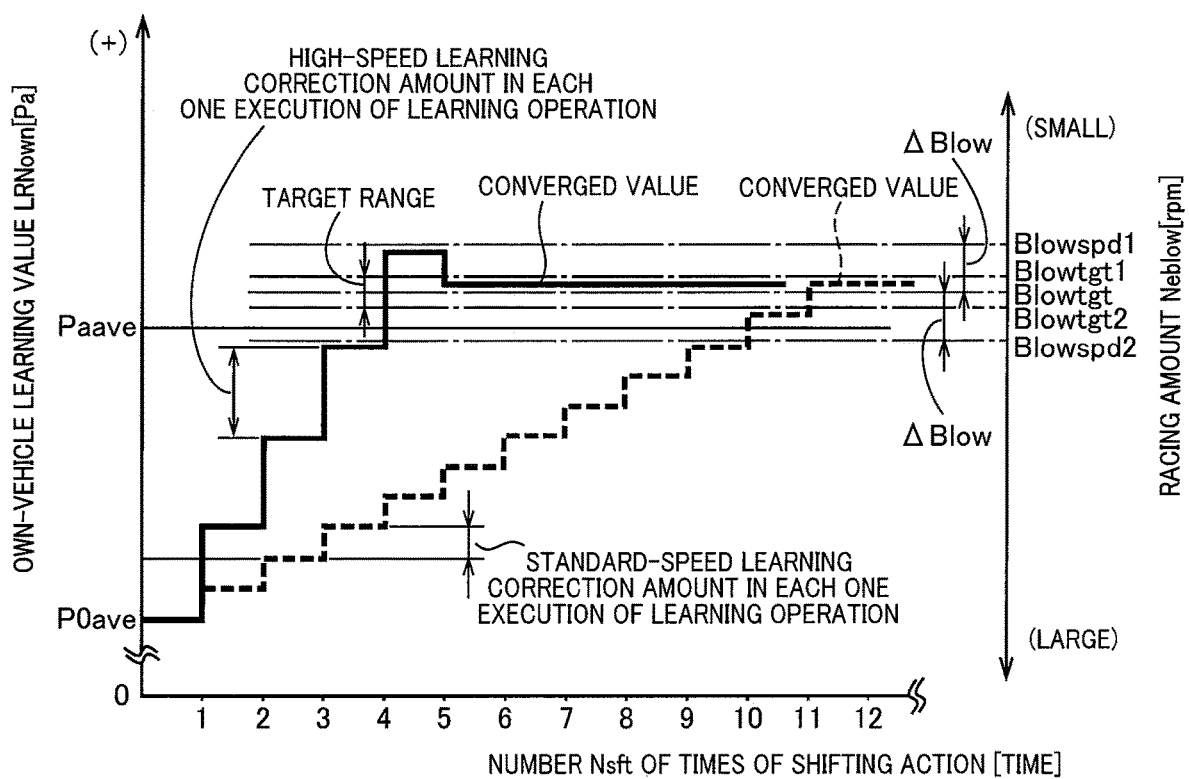
FIG. 14 is a view for explaining a high-speed learning and a standard-speed learning in the in-field learning operation.

FIG. 14 is a view for explaining the high-speed learning and the standard-speed learning in the in-field learning operation. In FIG. 14, solid line represents the own-vehicle learning value LRNown in the in-field learning operation according to this second embodiment, while broken line represents the own-vehicle learning value LRNown in the in-field learning operation according to comparative example. In FIG. 14, its horizontal axis represents the number Nsft of times of the shifting action, and its left-side vertical axis represents the own-vehicle learning value LRNown. Further, in FIG. 14, the racing amount Neblow of the engine rotational speed Ne in case of the own-vehicle learning value LRNown represented in the left-side vertical axis, is represented in right-side vertical axis, by the solid and broken lines. It is noted the racing amount Neblow represented in the right-side vertical axis is reduced in upward direction as seen in FIG. 14, and is increased in downward direction as seen in FIG. 14.

There will be described the in-field learning operation (represented by the solid line in FIG. 14) according to this second embodiment. As shown in FIG. 14, the own-vehicle learning value LRNown as the drive current value IDRw that is the control parameter subjected to the learning operation is increased or reduced by the correction amount in each one execution of the shift control operation, namely, in each one execution of the in-field learning operation, whereby the own-vehicle learning value LRNown is corrected such that the racing amount Neblow in the corrected own-vehicle learning value LRNown becomes close to the predetermined target value Blowtgt. As shown in FIG. 14, the correction amount in each one execution of the in-field learning operation in the high-speed learning is set to be as large as three times as that in the standard-speed learning, for example.

The own-vehicle learning value LRNown is reset, the initial value INIT is set to the average P0ave of the pre-learning values P0 of the data set GP0. When the degree of variation among the converged values Pa of the data set GPa is small, there is a high probability that the converged value Pa of the own-vehicle learning value LRNown as a result of repeated executions of the in-field learning operation is a value close to the average Paave of the converged values Pa of the data set GPa.

In the following description, a value smaller than the predetermined target value Blowtgt by the threshold difference value ΔBlow will be referred to as a lower limit threshold value Blowspd1 [rpm], and a value larger than the predetermined target value Blowtgt by the threshold difference value ΔBlow will be referred to as an upper limit threshold value Blowspd2 [rpm].

When the racing amount Neblow is smaller than the lower limit threshold value Blowspd1 or larger than the upper limit threshold value Blowspd2, and a direction (correction direction) from the own-vehicle learning value LRNown before the learning operation toward the own-vehicle learning value LRNown after the learning operation is a direction away from the average P0ave as the initial value INIT toward the average Paave, the own-vehicle learning value LRNown is increased or reduced by the correction amount of the high-speed learning. In other words, in each one execution of the in-field learning operation, when the difference (absolute value) between the target value Blowtgt and the racing amount Neblow is larger than threshold difference value ΔBlow (|Neblow−Blowtgt|>ΔBlow) and the correction direction is the above-described direction away from the average P0ave toward the average Paave, the own-vehicle learning value LRNown is increased or reduced by the correction amount of the high-speed learning.

On the other hand, when the racing amount Neblow is not smaller than the lower limit threshold value Blowspd1 or not larger than the upper limit threshold value Blowspd2, and/or the correction direction is an opposite direction that is opposite to the above-described direction away from the average P0ave toward the average Paave, the own-vehicle learning value LRNown is increased or reduced by the correction amount of the standard-speed learning. In other words, in each one execution of the in-field learning operation, when the difference (absolute value) between the target value Blowtgt and the racing amount Neblow is larger than threshold difference value ΔBlow (|Neblow−Blowtgt|>ΔBlow), and/or the correction direction is the above-described opposite direction, the own-vehicle learning value LRNown is increased or reduced by the correction amount of the standard-speed learning.

In the example shown in FIG. 14, while the number Nsft of times of the shifting action, i.e., the number of times of the learning operation, is from one to four, the above-described condition (2) is satisfied so that the own-vehicle learning value LRNown is increased or reduced by the correction amount of the high-speed learning, so as to be corrected toward the target value Blowtgt. In the fifth execution of the learning operation with the number Nsft of times of the shifting action being five, the above-described condition (3) is satisfied so that the own-vehicle learning value LRNown is increased or reduced by the correction amount of the standard-speed learning, so as to be corrected toward the target value Blowtgt. By the fifth execution of the learning operation, the racing amount Neblow falls within the target range between the target lower limit value Blowtgt1 and the target upper limit value Blowtgt2. That is, the own-vehicle learning value LRNown is converged by five execution of the learning operation.

There will be next described the in-field learning operation (represented by the broken line in FIG. 14) according to the comparative example. In the in-field learning operation according to the comparative example, only the standard-speed learning is executed, as shown in FIG. 14. While the number of times of the learning operation, is from one to eleven, the own-vehicle learning value LRNown is increased by only the correction amount of the standard-speed learning in each one execution of the learning operation, so as to corrected toward the target value Blowtgt. By the eleventh execution of the learning operation, the racing amount Neblow falls within the target range. That is, the own-vehicle learning value LRNown is converged by eleven execution of the learning operation.

Particularly, where the difference between the average P0ave of the pre-learning values P0 of the data set GP0 as the initial value INIT and the converged value Pa of the own-vehicle learning value LRNown is large, the own-vehicle learning value LRNown is converged more quickly by the in-field learning operation according to this second embodiment than by the in-field learning operation according to the comparative example.

Figure 15:
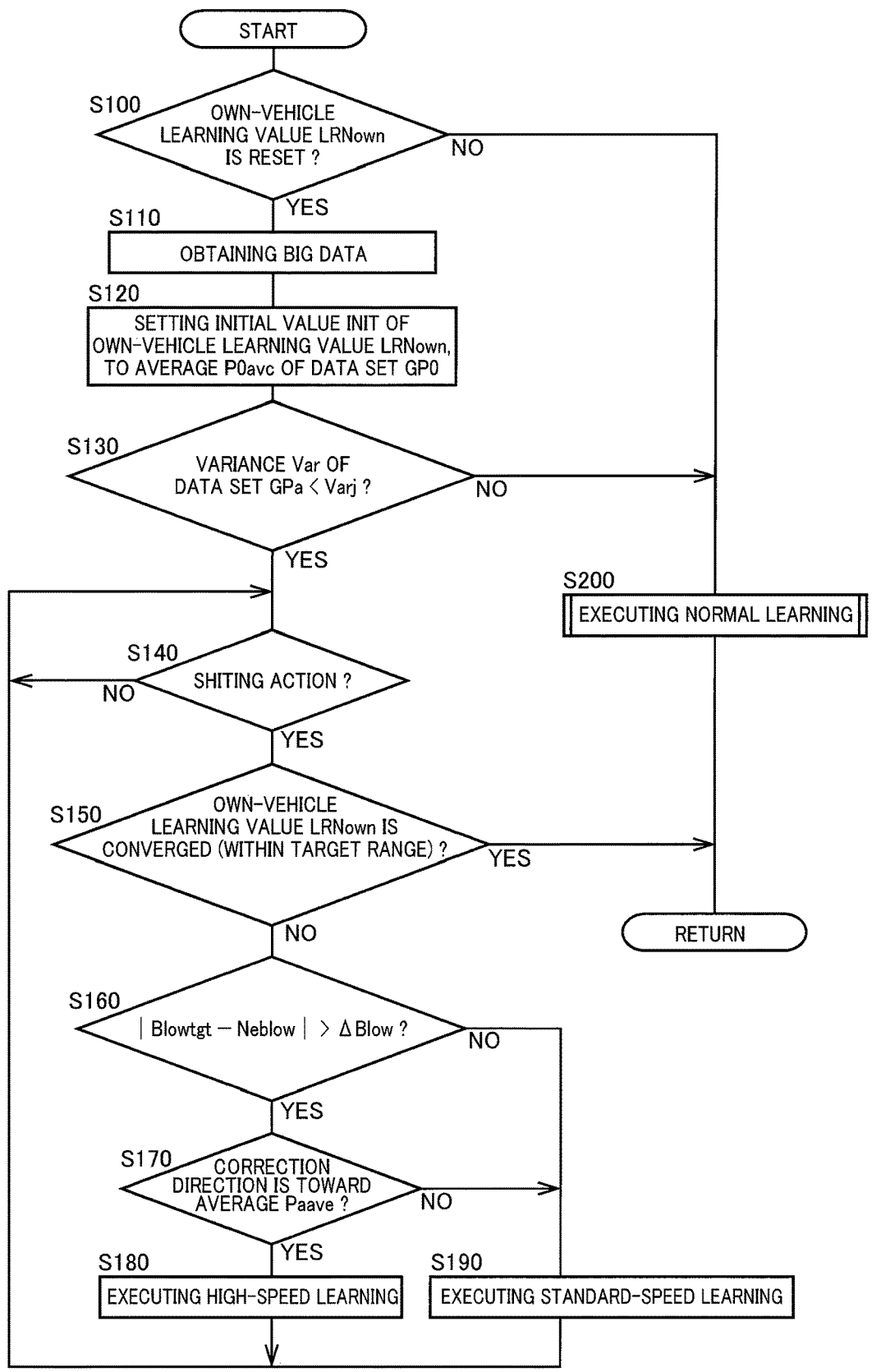
FIG. 15 is a flow chart showing, by way of example, a control routine executed by the ECU shown in FIG. 13, for explaining a major portion of a control operation of the ECU for the driving apparatus.

FIG. 15 is a flow chart showing a control routine executed by the ECU 300 that is shown in FIG. 13, for explaining a major portion of a control operation of the ECU 300. This control routine is executed in a repeated manner.

The control routine is initiated with step S100 corresponding to function of the reset determination portion 100f, which is implemented to determine whether the own-vehicle learning value LRNown is to be reset or not. When an affirmative determination is made at step S100, step S110 is implemented. When a negative determination is made at step S100, the control flow goes to step S200.

At step S110 corresponding to function of the transmitting/receiving portion 100e, the processed data of the data set GP0 and data set GPa are obtained from the server 160. Step S110 is followed by step S120.

At step S120 corresponding to function of the initial-value setting portion 300h, the initial value INIT, to which the own-vehicle learning value LRNown is to be reset, is set to the average P0ave of the pre-learning values P0 in the data set GP0. Step S120 is followed by step S130.

At step S130 corresponding to function of the variation determination portion 100g, it is determined whether the variance Var among the converged values Pa of the data set GPa is smaller than the threshold value Varj or not. When an affirmative determination is made at step S130, step S140 is implemented. When a negative determination is made at step S130, the control flow goes to step S200.

At step S140 corresponding to function of the learning portion 300c, it is determined whether the shifting action is executed in step-variable transmission portion 20 or not. When an affirmative determination is made at step S140, step S150 is implemented. When a negative determination is made at step S140, step S140 is implemented again.

At step S150 corresponding to function of the learning portion 300c, it is determined whether the own-vehicle learning value LRNown has been converged or not, by the in-field learning operation. When the racing amount Neblow of the engine rotational speed Ne is within the target range, it is determined that the own-vehicle learning value LRNown has been converged so that an affirmative determination is made at step S150 whereby one cycle of execution of the control routine is terminated. When a negative determination is made at step S150, step S160 is implemented.

At step S160 corresponding to function of the learning portion 300c, it is determined whether the difference between the target value Blowtgt and the racing amount Neblow is larger than the threshold difference value ΔBlow or not. When an affirmative determination is made at step S160, step S170 is implemented. When a negative determination is made at step S160, the control flow goes to step S190.

At step S170 corresponding to function of the learning portion 300c, it is determined whether the correction direction (i.e., direction of the correction made by the in-field learning operation in response to the determination is made at step S160) is the direction away from the average P0ave as the initial value INIT toward the average Paave of the of the converged values Pa of the data set GPa, or not. When an affirmative determination is made at step S170, step S180 is implemented. When a negative determination is made at step S170, the control flow goes to step S190.

At step S180 corresponding to function of the learning portion 300c, the high-speed learning, whose learning speed is higher than the standard-speed learning, is executed. Then, step S140 is implemented again.

At step S190 corresponding to function of the learning portion 300c, the standard-speed learning, whose learning speed is lower than the standard-speed learning, is executed. Then, step S140 is implemented again.

At step S200 corresponding to function of the learning portion 300c, the normal learning, which has been described above in the first embodiment, is executed. When step S200 has been implemented, one cycle of execution of the control routine is terminated.

In the present second embodiment, there are provided: (a) the reset determination portion 100f configured to determine whether the own-vehicle learning value LRNown of the control parameter is to be reset to the initial value INIT or not; (b) the transmitting/receiving portion 100e configured to obtain the information (such as the converged values Pa in the data set GPa) related to the converged values Pa of the learning values LRN of the control parameters in the plurality of vehicles provided with the respective transmission devices 40 which are the same in type as the transmission device 40 provided in the own vehicle 210 and which are controlled by using the respective learning values LRN in the respective vehicles; (c) the variation determination portion 100g configured to determine whether the variance Var among the converged values Pa of the data set GPa in the respective vehicles is smaller than the threshold value Varj or not; and (d) the learning portion 300c configured, when it is determined by the variation determination portion 100g that the variance Var is smaller than the threshold value Varj and when the own-vehicle learning value LRNown has been reset to the initial value INIT, to increase or reduce the own-vehicle learning value LRNown by a correction amount in each one execution of the learning operation, such that the correction amount is larger in a case in which the own-vehicle learning value LRNown is increased or reduced to be changed in a direction away from the initial value INIT toward the average Paave of the converged values Pa of the data set GPa, with the difference between the target value Blowtgt and the actual value of the racing amount Neblow being larger than the threshold difference value ΔBlow, than in a case in which the own-vehicle learning value LRNown is increased or reduced to be changed in an opposite direction opposite to the direction away from the initial value INIT toward the average of the converged values Pa. In a case in which the variance Var among the converged values Pa in the respective vehicles (provided with the respective transmission devices 40 each of which is the same in type as the transmission device 40 provided in the own vehicle 210) is small, there is a high probability that the own-vehicle learning value LRNown in the own vehicle 210 is converged to a value close to the average Paav of the converged values Pa of the data set GPa in the respective vehicles by the learning operation executed after the own-vehicle learning value LRNown has been reset to the initial value INIT. Therefore, in the case in which the variance Var among the converged values Pa in the data set GPa is relatively small, when the difference between the racing amount Neblow (that is the degree of racing of the engine rotational speed Ne upon the shifting action) and the target value Blowtgt is larger than the threshold difference value ΔBlow and the correction direction (i.e., direction of the correction made by the learning operation after the set) is the direction away from the average P0ave as the initial value INIT toward the average Paave of the converged values Pa of the data set GPa, the high-speed learning (whose learning speed is higher than in a case in which the correction direction is opposite to the direction away from the average P0ave toward the average Paave) is executed. Owing to these arrangements, it is possible to avoid an erroneous learning in the learning operation after the reset of the own-vehicle learning value LRNown, and also to cause the own-vehicle learning value LRNown to be quickly converged, whereby the controllability of the vehicle 10 can be quickly improved after the reset of the own-vehicle learning value LRNown.

This second embodiment provides substantially the same technical advantages as the above-described first embodiment, except the effects owing to the setting of the initial value INIT made by the initial value INIT in the first embodiment.

Third Embodiment

Figure 16:
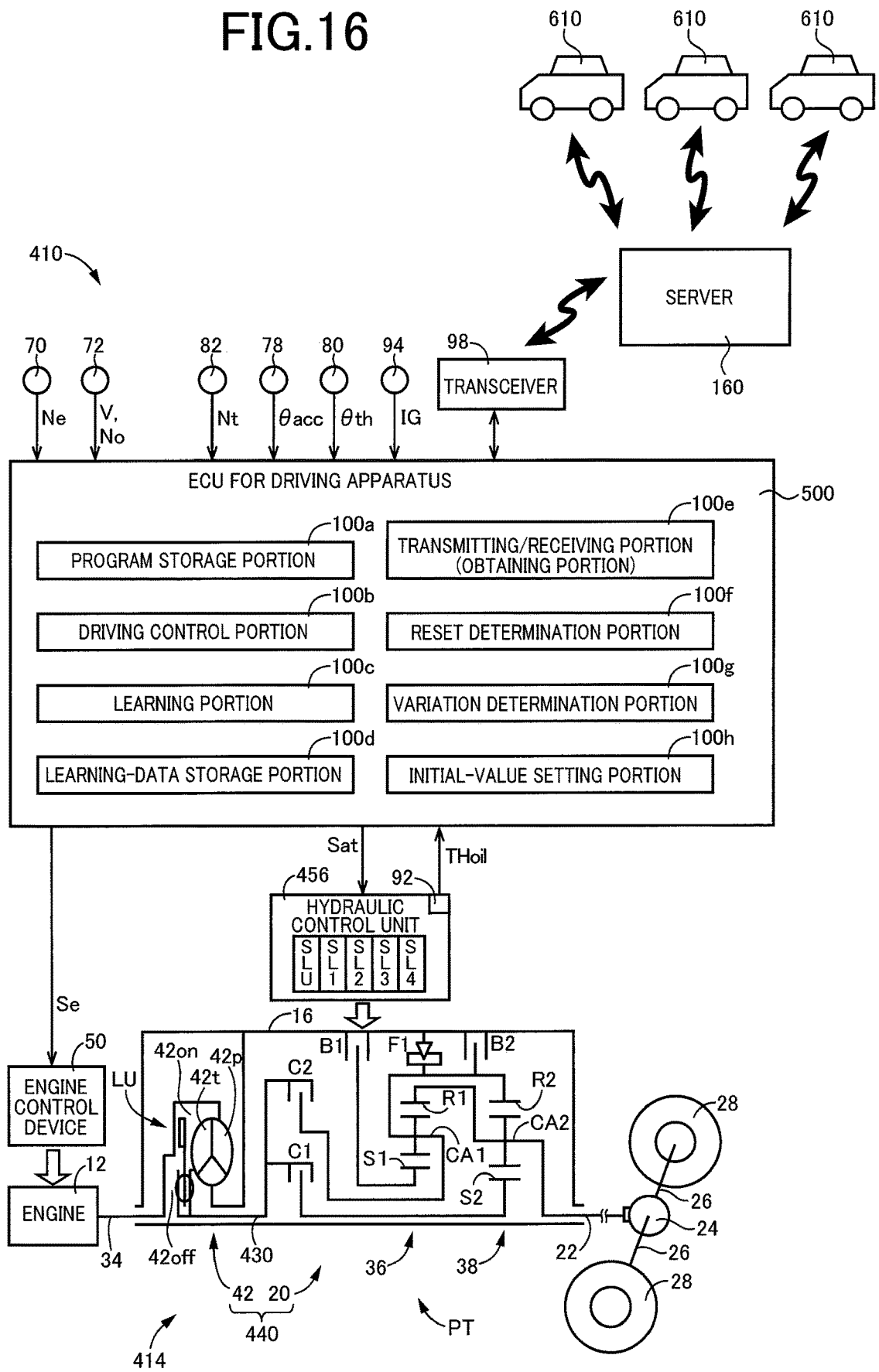
FIG. 16 is a view schematically showing a construction of a vehicle provided with an ECU for a driving apparatus, which is constructed according to a third embodiment of the present invention, and is a functional block diagram showing major portions of control functions for various control operations executed in the vehicle.

FIG. 16 is a view schematically showing a construction of a vehicle 410 provided with an ECU 500 for a driving apparatus, which is constructed according to a third embodiment of the present invention, and is a functional block diagram showing major portions of control functions for various control operations executed in the vehicle 410. FIG. 16 shows also the other vehicles 610 that are other than the vehicle 410 (that will be referred to as "own vehicle 410" where the vehicle 410 is to be particularly distinguished from the other vehicles 610). The vehicle 410 has substantially the same construction as the vehicle 10 in the above-described first embodiment, and is different from the vehicle 10 in that a transmission device (composite transmission) 440, a hydraulic control unit 456 and the ECU 500 are provided in place of the transmission device 40, hydraulic control unit 56 and ECU 100, respectively. Therefore, in the following description of this third embodiment, there will be described mainly elements different from the first embodiment. The same reference signs as used in the first embodiment will be used in the following second embodiment, to identify the functionally corresponding elements, and descriptions thereof are not provided. It is noted that the own vehicle 410 and the other vehicles 610 cooperate to constitute "a plurality of vehicles" recited in the appended claims.

The vehicle 410 includes a drive-force transmitting device 414 in addition to the engine 12, drive wheels 28, ECU 500 and transceiver 98.

The drive-force transmitting device 414 includes a torque convertor 42 that is a fluid-operated type drive-force transmitting device, in addition to the step-variable transmission portion 20 and other components, such that the torque convertor 42 and the step-variable transmission portion 20 are arranged in a series on a common axis, and cooperate with each other to constitute the transmission device 440. In the drive-force transmitting device 414, the torque convertor 42, step-variable transmission portion 20, differential gear device 24 and pair of axles 26 cooperate to constitute a drive-force transmitting path PT that is provided between the engine 12 and the drive wheels 28. It is noted that the transmission device 440 including the torque convertor 42 and the step-variable transmission portion 20 corresponds to "transmission" and "control-subject component" that are recited in the appended claims.

The torque convertor 42 includes a pump impeller 42p connected to the engine 12 through the connecting shaft 34 and a turbine impeller 42t connected to the step-variable transmission portion 20 through an intermediate transmitting member 430. The torque converter 42 is provided with a lockup clutch LU disposed between the pump impeller 42p and the turbine impeller 42t, so that the pump impeller 42p and the turbine impeller 42t are to be rotated integrally with each other when the lockup clutch LU is engaged. The torque convertor 42 has an engaging-side fluid chamber 42on and a releasing-side fluid chamber 42off, such that the hydraulic pressure is to be supplied to the engaging-side fluid chamber 42on for engaging the lockup clutch LU and such that the hydraulic pressure is to be supplied to the releasing-side fluid chamber 42off for releasing the lockup clutch LU. It is noted that the torque convertor 42 corresponds to "torque convertor" recited in the appended claims.

The hydraulic control unit 456 includes, in addition to the linear solenoid valves SL1-SL4 and other components that are provided also in the above-described hydraulic control unit 56, a linear solenoid valve SLU for executing a lockup-clutch control operation. The linear solenoid valve SLU is to be energized by a drive current IDRlu [A] that is to be controlled in accordance with the hydraulic control command signal Sat supplied from the ECU 500 to the hydraulic control unit 456. With the drive current IDRlu being controlled, an SLU output pressure Pslu [Pa] as an output pressure of the linear solenoid valve SLU is controlled. With the SLU output pressure Pslu being controlled, a lockup differential pressure Pdif [Pa], which is a pressure difference between the hydraulic pressure supplied to the engaging-side fluid chamber 42on and the hydraulic pressure supplied to the releasing-side fluid chamber 42off, is controlled. With the lockup differential pressure Pdif being controlled, an operation state of the lockup clutch LU is to be switched among a released state, a slipping state and an engaged state. Thus, the operation state of the lockup clutch LU is switched with the drive current IDRlu of the linear solenoid valve SLU being controlled.

The ECU 500 receives various input signals based on values detected by respective sensors provided in the vehicle 410. Specifically, the electronic control apparatus 90 receives: the output signal of the engine speed sensor 70 indicative of the engine rotational speed Ne; the output signal of the output speed sensor 72 indicative of the output-shaft rotational speed No; an output signal of a turbine speed sensor 82 indicative of a turbine rotational speed Nt [rpm] that is a rotational speed of the turbine impeller 42t of the torque convertor 42, the output signal of the accelerator-opening degree sensor 78 indicative of the acceleration opening degree θacc; the output signal of the throttle-opening degree sensor 80 indicative of the throttle opening degree θth; the output signal of the fluid temperature sensor 92 indicative of the working fluid temperature THoil in the hydraulic control unit 456; and the ignition signal IG of the ignition switch 94.

The ECU 500 generates various output signals to the various devices provided in the vehicle 410, such as: the engine control command signal Se that is to be supplied to the engine control device 50 for controlling the engine 14; and the hydraulic control command signal Sat that is to be supplied to the hydraulic control unit 456 for controlling the operation states of the hydraulically-operated frictional engagement devices CB and the operation state of the lockup clutch LU.

Like the ECU 100 in the above-described first embodiment, the ECU 500 functionally includes the program storage portion 100a, driving control portion 100b, learning portion 100c, learning-data storage portion 100d, transmitting/receiving portion 100e, reset determination portion 100f, variation determination portion 100g and initial-value setting portion 100h. It is noted that the ECU 500 corresponds to "vehicle control apparatus" recited in the appended claims.

In the above-described first and second embodiments, the control parameter subjected to the learning operation is the drive current value IDRw corresponding to the constant stand-by pressure of the engaging-side hydraulically-operated frictional engagement device CB in the step-variable transmission portion 20. In this third embodiment, the control parameter subjected to the learning operation is a drive current value IDRf of the linear solenoid valve SLU in execution of an engagement control operation for switching the operation state of the lockup clutch LU of the torque convertor 42 from the released state to the engaged state. The in-field learning operation is executed, when a pack clearance is eliminated in the lockup clutch LU, for thereby reducing a shock caused upon the engagement of the lockup clutch LU in the execution of the engagement control operation.

Hereinafter, there will be described the learning operation that is executed for the linear solenoid valve SLU when the pack clearance is eliminated in the lockup clutch LU, in the execution of the engagement control operation for placing the lockup clutch LU from the released state into the engaged state.

Figure 17:
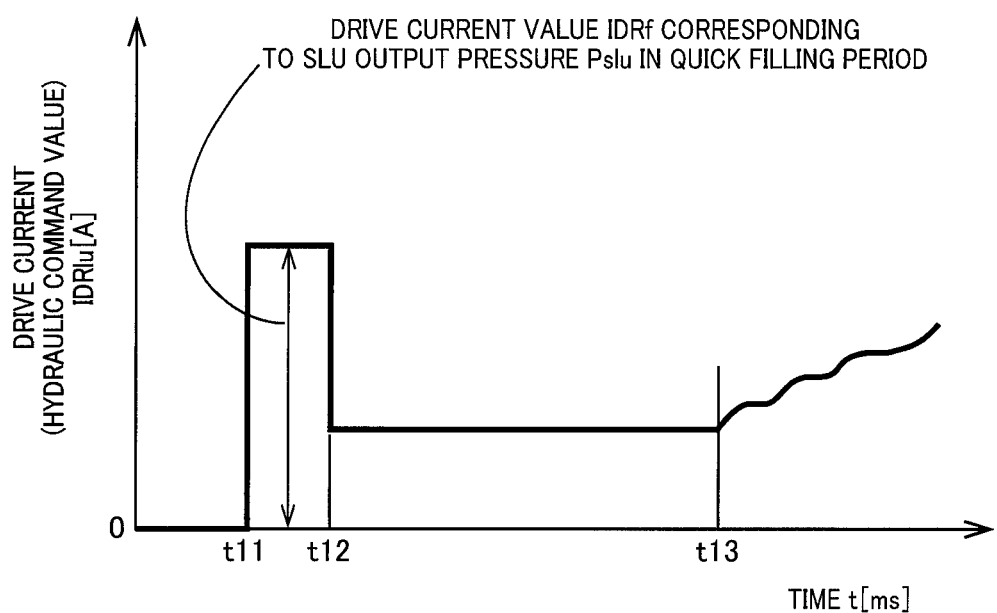
FIG. 17 is a time chart for explaining, by way of example, an operation of a linear solenoid valve during execution of an engagement control operation for a lockup clutch, more specifically, showing, by way of example, a change of the drive current applied to the linear solenoid valve in process of engagement of the lockup clutch.

FIG. 17 is a time chart for explaining, by way of example, an operation of the linear solenoid valve SLU during execution of the engagement control operation for the lockup clutch LU, more specifically, showing, by way of example, a change of the drive current IDRlu applied to the linear solenoid valve SLU in process of the engagement of the lockup clutch LU. Since the SLU output pressure Pslu as an output pressure of the linear solenoid valve SLU is dependent on the drive current IDRlu applied to the linear solenoid valve SLU, the drive current IDRlu can be a hydraulic command value for the SLU output pressure Pslu, like the drive current IDR that can be a hydraulic command value for the output pressure PSL of the linear solenoid valve SL in the above-described first embodiment, as described above with reference to FIG. 7.

As shown in FIG. 17, in a period (quick filling period) from a time point t11 to a time point t12, the drive current IDRlu is temporarily increased to eliminate the pack clearance. Then, in a period (constant stand-by pressure period) from the time point t12 to a time point t13, the drive current IDRlu is kept at a current value corresponding to a constant stand-by pressure by which the lockup clutch LU is held in its engagement stand-by state. The pack clearance is reduced so as to be eliminated in a period from a start point (time point t11) of the quick filling period to a start point (time point t13) of an inertia phase via a start point (time point t12) of the constant stand-by pressure period, namely, in a period to a time point at which the lockup clutch LU starts to be in the slipping state. The start point of the inertia phase is detected as a time point at which the turbine rotational speed Nt starts to be changed toward the engine rotational speed Ne. In a period from the time point t13 as the start point of the inertia phase to a time point at which the lockup clutch LU is placed into the engaged state, the slipping of the lockup clutch LU is subjected to a feedback control or the like, for example, such that the lockup clutch LU has a required torque capacity. In the time chart of FIG. 17, a relationship between the drive current IDRlu and the time tin process of engagement of the lockup clutch LU is shown, wherein the drive current IDRlu is the control parameter used for the engagement control operation for engaging the lockup clutch LU. For example, the drive current value IDRf corresponding to the SLU output pressure Pslu in the quick filling period (see FIG. 17) is the control parameter subjected to the learning operation. It is noted that the drive current value IDRf corresponds to "hydraulic command value" recited in the appended claims.

The learning portion 100c executes the in-factory learning operation and the in-field learning operation, when the pack clearance is eliminated in the lockup clutch LU, such that an actual inertia starting time Td [ms] (=t13−t11), which is a length of time until the inertia phase actually starts, is within a target range. The target range of the actual inertia starting time Td is a predetermined range that is determined through experimentation or determined by an appropriate design theory, such that an engaging shock and a length of time required to complete the engagement of the lockup clutch LU in the engagement control operation are in respective permissible ranges.

Specifically, when the actual inertia starting time Td is longer than the target range, it is assumed that a length of time for the elimination of the pack clearance is too large. Therefore, in the next execution of the engagement control operation, the drive current value IDRf in the quick filling period is made larger than the drive current value IDRf in the present execution of the engagement control operation by a correction amount as a predetermined amount by which the drive current value IDRf is to be changed in each one execution of the learning operation. That is, in the next execution of the pack clearance elimination, the drive current value IDRf is made larger than the drive current value IDRf in the present execution of the pack clearance elimination, by the correction amount. On the other hand, when the actual inertia starting time Td is shorter than the target range, it is assumed that the length of time for the elimination of the pack clearance is too small. Therefore, in the next execution of the engagement control operation, the drive current value IDRf in the quick filling period is made smaller than the drive current value IDRf in the present execution of the engagement control operation by the correction amount by which the drive current value IDRf is to be changed in each one execution of the learning operation. That is, in the next execution of the pack clearance elimination, the drive current value IDRf is made smaller than the drive current value IDRf in the present execution of the pack clearance elimination, by the correction amount.

The lockup differential pressure Pdif is controlled by the drive current IDRlu applied to the linear solenoid valve SLU. The engagement characteristic of the lockup clutch LU varies depending on also various conditions such as the engine rotational speed Ne, the turbine rotational speed Nt, a differential rotation ΔN [rpm] (=Ne−Nt) corresponding to a difference between the engine rotational speed Ne and the turbine rotational speed Nt, a hydraulic pressure [Pa] of the working fluid supplied to the releasing-side fluid chamber 42off, the working fluid temperature Thoil and an engine torque Te [Nm] that is an output of the engine 12. Therefore, the in-field learning operation may be executed for each range of each of these conditions.

By execution of the in-factory learning operation, the drive current value IDRf is corrected from the standard current value STN to a corrected current value that is obtained by adding the in-factory correction amount to the standard current value STN. The corrected current value, which is obtained by adding the in-factory correction amount to the standard current value STN, is stored as the pre-learning value P0 before the in-field learning operation, into the learning-data storage portion 100d. Further, the correction value CMP as the total of the correction amounts in the respective executions of the in-field learning operation is also stored into the learning-data storage portion 100d.

As a result of repeated executions of the in-field learning operation, the drive current value IDRf is corrected from the pre-learning value P0 to the learning value LRN that is obtained by adding the correction value CMP to the pre-learning value P0. With increase of a number Nluon of times of the engaging action, namely, with increase of the number of times of the execution of the in-field learning operation, the corrected drive current value IDRf is eventually converged into a certain range. After the corrected drive current value IDRf has been converged into the certain range, the drive current value IDRf is no longer changed substantially even if the learning operation is more repeated. The drive current value IDRf, which has become little variable, is the converged value Pa of the learning value LRN.

When the learning value LRN is converged, the transmitting/receiving portion 100e transmits information related to the in-field learning operation, to the server 160 via the transceiver 98, wherein the information related to the in-field learning operation includes: the pre-learning value P0, the learning value LRN; the attribute information of the vehicle 410 (such as vehicle type and running distance Drun [km]); a range of each of the conditions upon execution of the engagement control operation for the lockup clutch LU subjected to the learning operation, such as the engine rotational speed Ne, the turbine rotational speed Nt, the differential rotation ΔN (=Ne−Nt), the hydraulic pressure of the working fluid supplied to the releasing-side fluid chamber 42off, the working fluid temperature Thoil and the engine torque Te [Nm]; and the number Nluon of times of the engaging action in the same range of each of the conditions. It is noted the number Nluon of times of the shifting action is a cumulative number of times of the execution of the engagement control operation of the lockup clutch LU, which has been executed together with the execution of the in-field learning operation for learning the correction value CMP, and which has been executed in the same range of each of the above-described conditions, after the torque convertor 42 included in the transmission device 440 provided in the vehicle 410 had been started to be practically used for the first time (for example, after the vehicle 410 had been shipped from a factory, or after the vehicle 410 in which the transmission device 440 including the torque convertor 42 had been repaired or replaced with a new one had been delivered). The larger the number Nluon of times of the engaging action is, the longer the service period Tuse [h] is, wherein the service period Tuse is a length of time since the torque convertor 42 of the vehicle 410 has been started to be practically used for the first time. Therefore, the service period Tuse can be an index of the number Nluon of times of the engaging action in the torque convertor 42 of the vehicle 410. It is noted that the number Nluon of times of the engaging action corresponds to "number of times at which the engaging action has been executed in the lockup clutch" recited in the appended times.

The transmitting/receiving portion 100e obtains, from the server 160 via the transceiver 98, data related to the data set GP0 and the data set GPa, more precisely, processed data of the data set GP0 and the data set GPa that are substantially the same as the own vehicle 410 in terms of the range of each of the above-described conditions upon execution of the engagement control operation for the lockup clutch LU subjected to the learning operation, and the number Nluon of times of the engaging action in the same range of each of the conditions, wherein the processed data include the average P0*ave* of the pre-learning values P0 in the data set GP0 and the average Paave and the variance Var of the converged values Pa of the data set GPa. Thus, the transmitting/receiving portion 100e extracts, from among the above-described plurality of vehicles, at least one vehicle that is different from the own vehicle 410 by a predetermined value or less in the number Nluon of times of the engaging action in the torque convertor 42, and then obtains the above-described processed data of each of the at least one vehicle. That is, the transmitting/receiving portion 100e extracts, from among the plurality of vehicles, at least one vehicle that is similar to the own vehicle 410 in terms of the number Nluon of times of the engaging action in the lockup clutch LU, and then obtains the above-described processed data of each of the at least one vehicle. It is noted that the above-described predetermined value regarding the number Nluon of times of the engaging action is a predetermined value that is determined through experimentation or determined by an appropriate design theory, such that the at least one vehicle (that is different from the own vehicle 410 by the predetermined value or less in the number Nluon of times of the engaging action) is almost the same as the own vehicle 410 in terms of influence affected by the wear and deterioration of the parts constituting the torque convertor 42 so that it is considered that the at least one vehicle is close to the own vehicle 410 in terms of the converged value Pa of the learning value LRN.

The reset determination portion 100f determines that the own-vehicle learning value LRNown is to be reset, for example, (1) when the own vehicle 410 has been shipped and the torque convertor 42 provided in the own vehicle 410 has been started to be practically used for the first time, (2) when the torque convertor 42 or the linear solenoid valve SLU of the own vehicle 410 has been repaired or replaced with a new one, (3) the control program in accordance with which the torque convertor 42 of the own vehicle 410 is controlled has been version-upped or updated, and/or (4) the own-vehicle learning value LRNown has become an unexpected value that is outside a permissible range from a design point of view.

When it is determined by the variation determination portion 100g that the variance Var among the converged values Pa of the data set GPa is smaller than the threshold value Varj, the initial-value setting portion 100h determines an initial value INIT [A] to which the own-vehicle learning value LRNown is to be reset, based on the average Paave of the converged values Pa of the data set GPa. On the other hand, when it is determined by the variation determination portion 100g that the variance Var among the converged values Pa of the data set GPa is not smaller than the threshold value Varj, the initial-value setting portion 100h sets the initial value INIT (to which the own-vehicle learning value LRNown is to be reset) to the average P0*ave* of the pre-learning values P0 in the data set GP0, for example.

In the present third embodiment, the transmission device 440 includes the torque convertor 42, and the control parameter subjected to the learning operation is the drive current value IDRf by which the lockup clutch LU of the torque convertor 42 is to be controlled to be engaged. This arrangement provides substantially the same effects as those provided by the arrangement in the above-described first embodiment in which the control parameter subjected to the learning operation is the drive current value IDRw by which the step-variable transmission portion 20 is to be controlled to be placed in a selected one of the gear positions. Owing to this arrangement, it is possible to early improve issues such as the engaging shock that could be caused in the engaging action in the lockup clutch LU of the torque convertor 42 after the reset of the own-vehicle learning value LRNown.

In the present third embodiment, the transmitting/receiving portion 100e is configured to obtain the information (such as the processed data of the data set GP0 and data set GPa) related to the converged values Pa of the learning values LRN of the control parameters in at least one of the plurality of vehicles, wherein each of the at least one of the plurality of vehicles is different from the own vehicle 410 by the predetermined value or less in terms of the number Nluon of times of the engaging action in the lockup clutch LU of the torque convertor 42. The average Paave of the converged values Pa of the data set GPa in the above-described at least one of the plurality of vehicles that is similar to the own vehicle 410 in terms of the number Nluon of times of the engaging action in the lockup clutch LU of the torque convertor 42, is more likely to be a value close to the converged value of the own-vehicle learning value LRNown in the own vehicle 410, as compared with an average of the converged values Pa of the other vehicles that are not similar to the own vehicle 410 in terms of the number Nluon of times of the engaging action, namely, as compared with the processed data of the data set GP0 and data set GPa including data representing the number Nluon of times of the engaging action which is not close to that in the own vehicle 410. This is because it is considered that the above-described at least one of the plurality of vehicles (that is similar to the own vehicle 10 in terms of the number Nluon of times of the engaging action in the lockup clutch LU of the torque convertor 42) is almost the same as the own vehicle 410 in terms of influence affected by the wear and deterioration of the parts constituting the torque convertor 42. Therefore, it is possible to more reliably cause the own-vehicle learning value LRNown to be quickly converged by a smaller number of times of execution of the learning operation, whereby the controllability of the vehicle 410 can be further quickly improved after the reset of the learning value.

While the preferred embodiments of this invention have been described in detail by reference to the drawings, it is to be understood that the invention may be otherwise embodied.

In the above-described first embodiment, when it is determined that the variance Var among the converged values Pa of the learning values LRN of the data set GPa is smaller than the threshold value Varj, the initial-value setting portion 100h sets the initial value INIT (to which the own-vehicle learning value LRNown is reset), to the first learning value Pa1 that is offset from the average Paave of the converged values Pa of the data set GPa toward the tie-up side by the certain offset value ΔPa1. However, this arrangement is not essential. For example, the first learning value Pa1 may be offset from the average Paave in a direction away from the tie-up side. Further, the first learning value Pa1 does not have be necessarily offset from the average Paave, but may be substantially equal to the average Paave. When the variance Var among the converged values Pa of the data set GPa is smaller than the threshold value Varj, or when the degree of variation among the converged values Pa is small, there is a high probability that the own-vehicle learning value LRNown is converged to a value close to the average Paave of the converged values Pa of the data set GPa by the learning operation executed after the reset of the own-vehicle learning value LRNown. Therefore, as long as the initial value INIT (to which the own-vehicle learning value LRNown is reset) is set to the value close to the average Paave of the converged values Pa of the data set GPa, the own-vehicle learning value LRNown is likely to be quickly converged by the by the learning operation executed tafter the reset of the own-vehicle learning value LRNown, so that the controllability of the vehicle 10 can be early improved after the reset.

In the above-described first embodiment, when it is determined that the variance Var among the converged values Pa of the learning values LRN of the data set GPa is not smaller than the threshold value Varj, the initial-value setting portion 100h sets the initial value INIT (to which the own-vehicle learning value LRNown is reset), to the average P0ave of the pre-learning values P0 of the data set GP0. However, this arrangement is not essential. For example, the initial value INIT may be set to a value that is offset from the average P0ave, by a certain offset value ΔP0 [A] (see FIG. 11), toward the average Paave of the converged values Pa of the data set GPa. The certain offset value ΔP0 is a value offset from the average P0ave that is a criteria value, and is a value smaller than a difference (absolute value) between the average Paave and the average P0ave, for example. It is noted that the above-described value, to which the initial value INIT is set when the own-vehicle learning value LRNown is reset, and which is offset from the average P0ave by the certain offset value ΔP0, corresponds to "second learning value" recited in the appended claims.

In the above-described second embodiment, in the in-field learning operation executed by the learning portion 300c, the correction amount in each one execution of the learning operation in the high-speed learning is larger than that in the normal learning and that in the standard-speed learning. Further, the correction amount in each one execution of the learning operation in the standard-speed learning is smaller than that in the normal learning and that in the high-speed learning. However, this arrangement is not essential. As long as the correction amount in the high-speed learning is larger than that in the standard-speed learning, the correction amount in the normal learning and that in the standard-speed learning may be equal to each other, and the correction amount in the standard-speed learning may be larger than that in the normal learning, for example.

In the above-described second embodiment, the difference (=|Blowtgt−Blowspd2|) between the target value Blowtgt and the upper limit threshold value Blowspd2 and the difference (=|Blowtgt−Blowspd1|) between the target value Blowtgt and the lower limit threshold value Blowspd1 are both the threshold difference value ΔBlow and accordingly are equal to each other. However, the difference (=|Blowtgt−Blowspd2|) and the difference (=|Blowtgt−Blowspd1|) may be different from each other.

In the above-described first and second embodiments, the "control-subject component" and "transmission" recited in the appended claims are constituted by the transmission device 40 including the step-variable transmission portion 20 that is the automatic transmission of the planetary gear type configured to execute the "clutch-to-clutch" shifting operation. However, this arrangement is not essential. For example, the "control-subject component" and "transmission" recited in the appended claims may be constituted by a transmission device including an automatic transmission of synchronous meshing parallel-axes type configured to execute a shifting operation that is other than the "clutch-to-clutch" shifting operation. In the automatic transmission of synchronous meshing parallel-axes type, a desired gear position is established by a sleeve of a synchronization device being moved by operation of a hydraulically-operated frictional engagement device, toward a gear piece provided on a side surface of one of a pair of gears, and the operation of the hydraulically-operated frictional engagement device is controlled by a linear solenoid valve. In case of such an automatic transmission, a value of a drive current outputted to the linear solenoid valve and a period of output of the drive current can be control parameters subjected to the learning operation.

In the above-described first through third embodiments, the average P0ave of the pre-learning values P0 of the data set GP0, which corresponds to "average of the pre-learning values" recited in the appended claims, is the arithmetic mean of the pre-learning values P0. However, this arrangement is not essential. For example, a value such as a median and a mode (i.e., value that appears most often in the set of data values) of the pre-learning values P0 of the data set GP, which becomes close to the arithmetic mean of the pre-learning values P0 when the distribution of the pre-learning values P0 becomes close to a normal distribution, also corresponds to the "average of the pre-learning values". Further, in the above-described first through third embodiments, the average Paave of the converged values Pa of the data set GPa, which corresponds to "average of the converged values" recited in the appended claims, is the arithmetic mean of the converged values Pa. However, for example, a values such as a median and a mode of the converged values Pa of the data set GPa, which becomes close to the arithmetic mean of the converged values Pa when the distribution of the converged values Pa becomes close to a normal distribution, also corresponds to the "average of the converged values". There is no substantial difference the use of the arithmetic mean and the use of the median and mode in place of the arithmetic mean.

In the above-described first through third embodiments, the degree of variation among the converged values Pa (learning values LRN) of the data set GPa is determined by the variance Var among the converged values Pa of the data set GPa. However, this arrangement is not essential. For example, the degree of variation among the converged values Pa may be determined by a difference ΔPa [A] between a maximum value Pamax and a minimum value Pamin of the converged values Pa (see FIG. 11), a quartile deviation among the converged values Pa or a mean absolute deviation among the converged values Pa.

In the above-described first and second embodiments, the drive current value IDRw corresponding to the constant stand-by pressure applied to the engaging-side hydraulically-operated frictional engagement device in the "clutch-to-clutch" shifting operation, is the control parameter subjected to the learning operation. However, this arrangement is not essential. For example, the control parameter subjected to the learning operation may be the drive current valve of the drive current IDR for eliminating the pack clearance in the period from the time point t1 to the time point t2 shown in the time chart of FIG. 8, a length of time of the period from the time point t1 to the time point t2 in which the drive current IDR for the elimination of the pack clearance is outputted, or a length of time of the period from the time point t2 to the time point t3 in which the constant stand-by pressure is outputted. In the case of the above-described automatic transmission of synchronous meshing parallel-axes type, too, like in the above-described first embodiment, when the own-vehicle learning value LRNown as the parameter is reset to the initial value INIT, the initial value INIT may be set to the first learning value Pa1 that is offset from the average Paave of the converged values Pa of the data set GPa toward the tie-up side by the certain offset value ΔPa1, thereby making it possible to suppress seizing of the hydraulically-operated frictional engagement device CB, bearings and other components provided in the drive-force transmitting path PT, which could be caused in the event of an excessive racing of the engine 12. In the above-described third embodiment, the drive current value IDRf applied to eliminate the pack clearance in the lockup clutch LU in the quick filling period, is the control parameter subjected to the learning operation. However, this arrangement is not essential. For example, the control parameter subjected to the learning operation may be the drive current valve of the drive current IDR in the period (constant stand-by pressure period) from the time point t12 to the time point t13 shown in the time chart of FIG. 17, a length of time of the quick filling period, or a length of time of the constant stand-by pressure period. Further, the control parameter subjected to the learning operation does not have to be necessarily a control parameter used for controlling the engaging-side hydraulically-operated frictional engagement device of the step-variable transmission portion 20 and the lockup clutch LU of the torque convertor 42, but may be, for example, a fuel injection amount, a fuel injection timing and an ignition timing in the engine control device 50 for controlling the engine 12. Thus, the term "control parameter" is interpreted to mean a control value by which a component (such as the transmission devices 40, 440 and the engine 12) is to be controlled either directly or indirectly. With such a control value being corrected by the in-field learning operation, operation of the controlled component is changed.

In the above-described first and second embodiments, the transmitting/receiving portion 100e extracts, from among the plurality of vehicles (in each of which the learning operation has been executed), at least one vehicle that is different from the own vehicle 10, 210 by the predetermined value or less in the number Nsft of times of the shifting action in the step-variable transmission portion 20, and then obtains the processed data of the data set GP0 and data set GPa in each of the at least one vehicle. Further, in the above-described third embodiment, the transmitting/receiving portion 100e extracts, from among the plurality of vehicles (in each of which the learning operation has been executed), at least one vehicle that is different from the own vehicle 410 by the predetermined value or less in the number Nluon of times of the engaging action in the lockup clutch LU, and then obtains the processed data of the data set GP0 and data set GPa in each of the at least one vehicle. However, these arrangements are not essential. For example, it is also possible to extract, from among the plurality of vehicles, at least one vehicle that is different from the own vehicle 10, 210, 410 by a predetermined value or less in the running distance Drun or the service period Tuse of the step-variable transmission portion 20 and the torque convertor 44, instead of the number Nsft of times of the shifting action and the number Nluon of times of the engaging action, and to obtain the processed data of the data set GP0 and data set GPa in each of the at least one vehicle. It is noted that the predetermined value regarding each of the running distance Drun and the service period Tuse is a predetermined value that is determined through experimentation or determined by an appropriate design theory, such that the at least one vehicle is almost the same as the own vehicle 10, 210, 410 in terms of influence affected by the wear and deterioration of the parts constituting the step-variable transmission portion 20 or torque convertor 42 so that it is considered that the at least one vehicle is close to the own vehicle 10, 210, 410 in terms of the converged value Pa of the learning value LRN.

There is a tendency that the number Nsft of times of the shifting action and the number Nluon of times of the engaging action are increased with increase of the running distance Drun and the service period Tuse of each of the step-variable transmission portion 20 and the torque convertor 42. Therefore, it is considered that a vehicle or vehicles, which are different from the own vehicle 10, 210, 410 by a predetermined value or less in the running distance Drun or the service period Tuse of the step-variable transmission portion 20 or the torque convertor 42, are almost the same as the own vehicle 10, 210, 410 in terms of influence affected by the wear and deterioration of the parts constituting the step-variable transmission portion 20 included in the transmission device 40 and the lockup clutch LU included in the torque convertor 42. Therefore, it is also possible to extract, from among the plurality of vehicles, at least one vehicle that is different from the own vehicle 10, 210, 410 by the predetermined value or less in at least one of the number Nsft of times of the shifting action, the number Nluon of times of the engaging action, the service period Tuse and the running distance Drun, and then to obtain the processed data of the data set GP0 and data set GPa in each of the at least one vehicle. In this arrangement, too, the own-vehicle learning value LRNown can be quickly converged with a small number of times of execution of the learning operation after the reset of the own-vehicle learning value LRNown. Further, it is also possible to extract, from among the plurality of vehicles, at least one vehicle that is different from the own vehicle 10, 210, 410 by a value larger than the predetermined value in any one of the number Nsft of times of the shifting action, the number Nluon of times of the engaging action, the service period Tuse and the running distance Drun, and then to obtain the processed data of the data set GP0 and data set GPa in each of the at least one vehicle. Even in this arrangement, the own-vehicle learning value LRNown can be quickly converged with a small number of times of execution of the learning operation after the reset, as compared with a case (such as execution of the normal learning) without utilizing the processed data of the data set GP0 and data set GPa.

In the above-described first through third embodiments, the transmitting/receiving portion 100e obtains the information related to the data set GPa including the converged values Pa of the learning values LRN of the control parameters in the plurality of vehicles which include the own vehicle 10, 210, 410 and the other vehicles 610 and which are provided with the step-variable transmission portions 20 or the torque convertors 42 included in the transmission devices 40, 440 of the same type. However, this arrangement is not essential. For example, the information obtained by the transmitting/receiving portion 100e may be information which is related to the data set GPa including the converged values Pa of the learning values LRN of the control parameters in the plurality of other vehicles 610 and which does not include the converged value Pa of the own-vehicle learning value LRNown. That is, as long as the information obtained by the transmitting/receiving portion 100e is related to the converged values Pa of the learning values LRN of the control parameters in the plurality of vehicles (in each of which the learning operation has been executed) provided with the step-variable transmission portions 20 or the torque convertors 42 included in the transmission devices 40, 440 of the same type, the information obtained by the transmitting/receiving portion 100e does not have to be necessarily information of the other vehicles 610 and also the own vehicle 10, 210, 410, but may be information of only the other vehicles 610.

In the above-described first and second embodiments, the learning portion 100c, 300c executes the in-field learning operation, depending on the racing amount Neblow as the degree of racing of the engine rotational speed Ne. However, this arrangement is not essential. For example, the learning portion 100c, 300c may execute the in-field learning operation, such that, in place of the racing amount Neblow, at least one of a racing amount Nmblow [rpm] as the degree of racing of the MG2 rotational speed Nm, a racing time TMeblow [ms] as the degree of racing of the engine rotational speed Ne and a racing time TMmblow [ms] as the degree of racing of the MG2 rotational speed Nm falls in a predetermined target range. The racing amount Nmblow is to be detected as a temporary increase of the MG2 rotational speed Nm in process of a shifting action. Each of the racing time TMeblow and racing time TMmblow is detected as a length of time of the temporary increase of a corresponding one of the engine rotational speed Ne and the MG2 rotational speed Nm in process of the shifting action. The predetermined target range for each of the racing time TMeblow, racing amount Nmblow and racing time TMmblow is a range that is determined through experimentation or determined by an appropriate design theory, such that the shifting shock and a length of time required to complete the shifting action in the "clutch-to-clutch" shifting operation fall in respective permissible ranges. It is noted that any one of the racing amount Neblow and racing time TMeblow of the engine rotational speed Ne and the racing amount Nmblow and racing time TMmblow of the MG2 rotational speed Nm corresponds to "degree of racing" recited in the appended claims.

In the above-described first through third embodiments, there is not provided a guard value GD [A] for preventing an erroneous learning in the in-field learning operation. However, the guard value GD may be provided. Specifically described, in a case in which an absolute value of the correction value CMP as a total of the correction amounts in respective executions of the in-field learning operation falls outside a range defined by the guard value GD (>0), namely, when CMP←−GD or GD←−CMP, the drive current value IDRw or the drive current value IDRf, which is subjected to the learning operation, is corrected by only an amount corresponding to the guard value GD, namely, only an amount corresponding to a minimum value (−GD) or a maximum value (GD) of the defined range. On the other hand, in a case in which the absolute value of the correction value CMP falls within the range defined by the guard value GD (>0), namely, when −GD≤CMP≤GD, the drive current value IDRw or the drive current value IDRf is corrected by the correction value CMP in the field learning operation. Thus, the guard value GD defines an upper limit of the absolute value of the correction value CMP that is the total of the correction amounts in respective executions of the in-field learning operation.

In the above-described first through third embodiments, the ECU 100, 500 functionally includes the initial-value setting portion 100h. In the above-described second embodiment, the ECU 300 functionally includes the learning portion 300c. However, these arrangements are not essential. For example, in the first embodiment, the ECU 100 may be provided with the learning portion 300c in place of the learning portion 100c. The ECU for the driving apparatus may exclude either one of the initial-value setting portion 100h and the learning portion 300c.

In the above-described first through third embodiments, the ECU 100, ECU 300 and ECU 500 are provided as the ECU for the driving apparatus. However, these arrangements are not essential. For example, the ECU 100, ECU 300 and ECU 500 may be combined into a single ECU, together with other control functions as needed. Further, the control functions of each of the ECU 100, ECU 300 and ECU 500 may be constituted by respective microcomputers, or at least one of the control functions of each of the ECU 100, ECU 300 and ECU 500 may be constituted by an external memory.

In the above-described first and second embodiments, each of the vehicles 10, 210 is the hybrid vehicle. In the above-described third embodiment, the vehicle 410 is a vehicle including only the engine 12 as the drive force source. However, the present invention is applicable also to a vehicle including only a rotating machine as the drive force source.

It is to be understood that the embodiments described above are given for illustrative purpose only, and that the present invention may be embodied with various modifications and improvements which may occur to those skilled in the art.

NOMENCLATURE OF ELEMENTS

10: own vehicle (vehicle)
20: step-variable transmission portion (step-variable transmission)
40: transmission device (transmission, control-subject component)
42: torque convertor
100: ECU for driving apparatus (vehicle control apparatus)
100e: transmitting/receiving portion (obtaining portion)
100f: reset determination portion
100g: variation determination portion
100h: initial-value setting portion
210: own vehicle (vehicle, plurality of vehicle)
300: ECU for driving apparatus (vehicle control apparatus)
300c: learning portion
410: own vehicle (vehicle, plurality of vehicle)
440: transmission device (transmission, control-subject component)
500: ECU for driving apparatus (vehicle control apparatus)
610: other vehicles (plurality of vehicle)
Blowtgt: predetermined target value
Drun: running distance
IDRf: drive current value (hydraulic command value)
IDRw: drive current value (hydraulic command value)
INIT: initial value
LRN: learning value
LRNown: own-vehicle learning value
Neblow: racing amount (degree of racing)
Nluon: number of engaging action
Nmblow: racing amount (degree of racing)
Nsft: number of shifting action
P0: pre-learning value
P0ave: average
Pa: converged value
Pa1: first learning value
Paave: average
TMeblow: racing time (degree of racing)
TMmblow: racing time (degree of racing)
Tuse: service period
Var: variance (degree of variation)
Varj: threshold value
ΔBlow: threshold difference value
ΔPa1: certain offset value

What is claimed is:

1. A vehicle control apparatus for controlling a transmission provided in a vehicle, by using a learning value of a hydraulic command value of the transmission, which is obtained by a learning operation, the vehicle control apparatus comprising:
an electronic control unit configured to:
determine whether the learning value of the hydraulic command value is to be reset to an initial value or not;
obtain information related to converged values of learning values of hydraulic command values in a plurality of vehicles provided with respective transmissions each of which is a same in type as the transmission provided in the vehicle, the respective transmissions being controlled by using the respective learning values in the respective vehicles;
determine whether a degree of variation among the converged values in the respective vehicles is smaller than a threshold value or not; and
in response to determining that the learning value is to be reset to the initial value, cause the learning value to be converged by a smaller number of times of execution of the learning operation in a case in which the degree of the variation among the converged values in the respective vehicles is smaller than the threshold value, than in a case in which the degree of the variation is not smaller than the threshold value.

2. The vehicle control apparatus according to claim 1, wherein the electronic control unit is configured to:
set the initial value to a first learning value that is dependent on an average of the converged values in the respective vehicles, upon determining that the degree of the variation is smaller than the threshold value and the learning value is to be reset to the initial value, and
set the initial value to a second learning value that is dependent on an average of pre-learning values of the hydraulic command values in the respective vehicles, upon determining that the degree of the variation is not smaller than the threshold value and the learning value is to be reset to the initial value.

3. The vehicle control apparatus according to claim 1, wherein, upon determining that the degree of the variation is smaller than the threshold value and when the learning value has been reset to the initial value, the electronic control unit is configured to increase or reduce the learning value by a correction amount in each one execution of the learning operation, such that the correction amount is larger in a case in which the learning value is increased or reduced to be changed in a direction away from the initial value toward an average of the converged values, than in a case in which the learning value is increased or reduced to be changed in an opposite direction opposite to the direction away from the initial value toward the average of the converged values.

4. The vehicle control apparatus according to claim 1, wherein:
the transmission includes a step-variable transmission configured to establish a selected one a plurality of gear positions, and
the hydraulic command value is a command value in a shift control operation for shifting the step-variable transmission from one gear position of the plurality of gear positions to another gear position of the plurality of gear positions.

5. The vehicle control apparatus according to claim 2, wherein:
the transmission includes a step-variable transmission configured to establish a selected one a plurality of gear positions,
the hydraulic command value is a command value in a shift control operation for shifting the step-variable transmission from one of the plurality of gear positions to another gear position of the plurality of gear positions,
the step-variable transmission is configured to establish the another gear position of the plurality of gear positions with a hydraulic engagement device that is placed in one of an engaged state and a released state, and
the first learning value, to which the initial value is set, is different from the average of the converged values by a predetermined offset value, and the first learning value is offset from the average toward a value that maximizes a speed at which the hydraulic engagement device is to be placed in the one of the engaged state and the released state.

6. The vehicle control apparatus according to claim 3, wherein:
the transmission includes a step-variable transmission configured to establish a selected one of a plurality of gear positions,
the hydraulic command value is a command value in a shift control operation for shifting the step-variable transmission from one gear position of the plurality of gear positions to another gear position of the plurality of gear positions, and
the electronic control unit is configured to execute the learning operation, based on a degree of racing of a drive force source of the vehicle in execution of the shift control operation for shifting the step-variable transmission from the one gear position of the plurality of gear positions to the another gear position of the plurality of gear positions.

7. The vehicle control apparatus according to claim 6, wherein, when a difference between a target value and an actual value of the degree of the racing is larger than a threshold difference value, the electronic control unit is configured to increase or reduce the learning value by the correction amount in each one execution of the learning operation, such that the correction amount is larger in the case in which the learning value is increased or reduced to be changed in the direction away from the initial value toward an average of the converged values, than in the case in which the learning value is increased or reduced to be changed in the opposite direction opposite to the direction away from the initial value toward the average of the converged values.

8. The vehicle control apparatus according to claim 4, wherein the electronic control unit is configured to obtain the information related to the converged values of the learning values of the hydraulic command values in at least one of the plurality of vehicles, each of the at least one of the plurality of vehicles being different from the vehicle by a predetermined value or less in at least one of (i) a number of times at which the shift control operation has been executed in the step-variable transmission, (ii) a period of time for which the step-variable transmission has been used, and (iii) a running distance for which each of the plurality of vehicles has run with use of the step-variable transmission.

9. The vehicle control apparatus according to claim 1, wherein:
the transmission includes a torque convertor, and
the hydraulic command value is a command value in an engagement control operation for controlling an engaging action of a lockup clutch of the torque convertor.

10. The vehicle control apparatus according to claim 9, wherein the electronic control unit is configured to obtain the information related to the converged values of the learning values of the hydraulic command values in at least one of the plurality of vehicles, each of the at least one of the plurality of vehicles is different from the vehicle by a predetermined value or less in at least one of (i) a number of times at which the engaging action has been executed in the lockup clutch, (ii) a period of time for which the lockup clutch has been used, and (iii) a running distance for which each of the plurality of vehicles has run with use of the lockup clutch.

11. The vehicle control apparatus according to claim 1, wherein the electronic control unit is configured to determine whether the degree of variation among the converged values in the respective vehicles is smaller than the threshold value or not, by determining whether a variance among the converged values in the respective vehicles is smaller than the threshold value or not.

* * * * *